United States Patent
Kang et al.

(10) Patent No.: US 12,477,365 B2
(45) Date of Patent: Nov. 18, 2025

(54) INFORMATION REPORTING METHOD, INFORMATION RECEIVING METHOD, TERMINAL, AND NETWORK CONTROL ENTITY

(71) Applicant: VIVO MOBILE COMMUNICATION CO., LTD., Guangdong (CN)

(72) Inventors: Yanchao Kang, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 384 days.

(21) Appl. No.: 17/520,884

(22) Filed: Nov. 8, 2021

(65) Prior Publication Data
US 2022/0060924 A1  Feb. 24, 2022

Related U.S. Application Data

(63) Continuation of application No. PCT/CN2020/089363, filed on May 9, 2020.

(30) Foreign Application Priority Data

May 9, 2019  (CN) .......................... 201910385825.2

(51) Int. Cl.
*H04W 24/10*  (2009.01)

(52) U.S. Cl.
CPC .................. *H04W 24/10* (2013.01)

(58) Field of Classification Search
CPC ....... H04W 24/10; H04W 4/24; H04W 92/18; H04L 12/1407; H04M 15/61; H04M 15/62; H04M 15/66; H04M 15/85
See application file for complete search history.

(56) References Cited

U.S. PATENT DOCUMENTS

| | | | |
|---|---|---|---|
| 5,852,630 A * | 12/1998 | Langberg | H04L 27/2647 375/219 |
| 2012/0094608 A1 | 4/2012 | Shi et al. | |
| 2013/0163454 A1 | 6/2013 | Liang et al. | |
| 2014/0273943 A1* | 9/2014 | Wu | H04L 12/1485 455/406 |
| 2014/0329494 A1 | 11/2014 | Zisimopoulos et al. | |
| 2015/0229779 A1* | 8/2015 | Goermer | H04W 4/023 370/259 |

(Continued)

FOREIGN PATENT DOCUMENTS

| | | |
|---|---|---|
| CN | 101932045 A | 12/2010 |
| CN | 102111805 A | 6/2011 |

(Continued)

OTHER PUBLICATIONS

Qualcomm Inc., "Carrier and resource selection in carrier aggregation for V2X Phase 2", 3GPP TSG RAN WG2 Meeting #100, R2-1713405, Reno, USA, Nov. 27-Dec. 1, 2017.

(Continued)

*Primary Examiner* — Kenneth T Lam
(74) *Attorney, Agent, or Firm* — Price Heneveld LLP

(57) ABSTRACT

This disclosure provides an information reporting method, an information receiving method, a terminal, and a network control entity. The method includes reporting information about air interface resources used by the terminal in proximity-based communication.

14 Claims, 10 Drawing Sheets

(56) References Cited

U.S. PATENT DOCUMENTS

| | | |
|---|---|---|
| 2015/0257186 A1 | 9/2015 | Fukuta |
| 2015/0326738 A1* | 11/2015 | Li .......................... H04M 15/64 |
| | | 455/406 |
| 2016/0100355 A1 | 4/2016 | Chen et al. |
| 2016/0219590 A1 | 7/2016 | Khawer et al. |
| 2016/0261757 A1 | 9/2016 | Rajadurai et al. |
| 2016/0381663 A1* | 12/2016 | Zhao ...................... H04W 76/14 |
| | | 370/329 |
| 2017/0289361 A1* | 10/2017 | Li .......................... H04M 15/43 |
| 2018/0110060 A1* | 4/2018 | Huang .................. H04W 72/21 |
| 2018/0159935 A1 | 6/2018 | Cavalcanti et al. |
| 2019/0239064 A1* | 8/2019 | Stojanovski ............ H04W 8/26 |
| 2019/0289459 A1* | 9/2019 | Shan ...................... H04W 76/25 |
| 2022/0039080 A1* | 2/2022 | Khoryaev ............... H04W 4/40 |

FOREIGN PATENT DOCUMENTS

| | | |
|---|---|---|
| CN | 103002578 A | 3/2013 |
| CN | 104144437 A | 11/2014 |
| CN | 104780609 A | 7/2015 |
| CN | 105191210 A | 12/2015 |
| WO | 2013182422 A1 | 12/2013 |
| WO | 2014069221 A1 | 5/2014 |
| WO | 2015065079 A1 | 5/2015 |
| WO | 2015107399 A1 | 7/2015 |
| WO | 2016033810 A1 | 3/2016 |
| WO | 2017196249 A1 | 11/2017 |

OTHER PUBLICATIONS

"3rd Generation Partnership Project; Technical Specification Group Services and System Aspects; Service aspects; Charging and billing (Release 15)", 3GPP TS 22.115 V15.5.0 (Sep. 2018), Valbonne, France.

Qualcomm Inc., "Discussion paper on Charging Support of Prose Direct Communication of Public Safety UE", 3GPP TSG SA WG5 (Telecom Management) Meeting #95, S5-143188, May 12-16, 2014 Sapporo (Japan).

"3rd Generation Partnership Project; Technical Specification Group Services and System Aspects; Telecommunication management; Charging management; Proximity-based Services (ProSe) charging (Release 12)", 3GPP TS 32.277 V12.2.0 (Jun. 2015), Valbonne, France.

* cited by examiner

INFORMATION REPORTING METHOD, INFORMATION RECEIVING METHOD, TERMINAL, AND NETWORK CONTROL ENTITY

CROSS-REFERENCE TO RELATED APPLICATIONS

The present application is a continuation application of International Application No. PCT/CN2020/089363 filed on May 9, 2020, which claims priority of Chinese Patent Application No. 201910385825.2, filed in China on May 9, 2019, both of which are incorporated herein by reference in their entireties.

TECHNICAL FIELD

This disclosure relates to the field of communications technologies, and in particular, to an information reporting method, an information receiving method, a terminal, and a network control entity.

BACKGROUND

Current communication systems support proximity-based communication, such as device-to-device (Device-to-Device, D2D), vehicle to everything (Vehicle to everything, V2X), unmanned aerial system (Unmanned Aerial System, UAS), and proximity-based service (ProSe). In proximity-based communication, terminals can directly communicate with each other through a PC5 interface. In addition, in proximity-based communication, a terminal can perform communication in an online or offline state. For current PC5-based communication, a charging manner for PC5 direct communication (PC5 direct communication) is reused. This charging manner is still based on an amount of data transmitted during communication, which cannot directly reflect air interface resources consumed by a terminal, leading to a relatively poor charging effect.

SUMMARY

Embodiments of this disclosure provide an information reporting method, an information receiving method, a terminal, and a network control entity, to resolve the problem of a relatively poor charging effect caused by failure to directly reflect air interface resources consumed by a terminal.

According to a first aspect, an embodiment of this disclosure provides an information reporting method, applied to a terminal and including:
reporting information about air interface resources used by the terminal in proximity-based communication.

According to a second aspect, an embodiment of this disclosure provides an information receiving method, applied to a network control entity and including:
receiving information about air interface resources used by a terminal in proximity-based communication.

According to a third aspect, an embodiment of this disclosure provides a terminal, including:
a reporting module, configured to report information about air interface resources used by the terminal in proximity-based communication.

According to a fourth aspect, an embodiment of this disclosure provides a network control entity, including:
a receiving module, configured to receive information about air interface resources used by a terminal in proximity-based communication.

According to a fifth aspect, an embodiment of this disclosure provides a terminal, including a memory, a processor, and a program stored in the memory and capable of running on the processor, where when the program is executed by the processor, the steps of the information reporting method according to the embodiment of this disclosure are implemented.

According to a sixth aspect, an embodiment of this disclosure provides a network device, including a memory, a processor, and a program stored in the memory and capable of running on the processor, where when the program is executed by the processor, the steps of the information receiving method according to the embodiment of this disclosure are implemented.

According to a seventh aspect, an embodiment of this disclosure provides a computer-readable storage medium, where the computer-readable storage medium stores a program, and when the program is executed by a processor, the steps of the information reporting method according to the embodiment of this disclosure are implemented, or when the program is executed by a processor, the steps of the information receiving method according to the embodiment of this disclosure are implemented.

In the embodiments of this disclosure, the information about air interface resources used by the terminal in the proximity-based communication is reported, so that a network side can perform charging based on the information about air interface resources used by the terminal in the proximity-based communication, thereby improving the charging effect of the proximity-based communication.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "include" and "comprise" and any other variants thereof in the specification and claims of this application are intended to cover the non-exclusive inclusion. For example, a process, method, system, product, or device that includes a series of steps or units is not necessarily limited to those expressly listed steps or units, but may include other steps or units not expressly listed or inherent to such process, method, product, or device. In addition, in the specification and claims, the use of "and/or" represents presence of at least one of the connected objects, for example, "A and/or B" represents the following three cases: A alone, only B alone, and both A and B. Similarly, in the specification and claims, the use of "at least one of A or B" or "at least one of A and B" represents the following three cases: A alone, B alone, or both A and B.

In the embodiments of this disclosure, terms such as "exemplary" or "for example" are used to represent an example, an instance, or an illustration. Any embodiment or design solution described as "exemplary" or "for example" in the embodiments of this disclosure should not be construed as being more preferred or advantageous than other embodiments or design solutions. To be precise, the use of terms such as "exemplary" or "for example" is intended to present a related concept in a specific manner.

The following describes the embodiments of this disclosure with reference to the accompanying drawings. An information reporting method, an information receiving method, a terminal, and a network control entity according to the embodiments of this disclosure can be applied to a wireless communications system. The wireless communications system may be a 5G system, an evolved long term evolution (Evolved Long Term Evolution, eLTE) system, a long term evolution (Long Term Evolution, LTE) system, a later evolved communications system, or the like.

Figure 1:
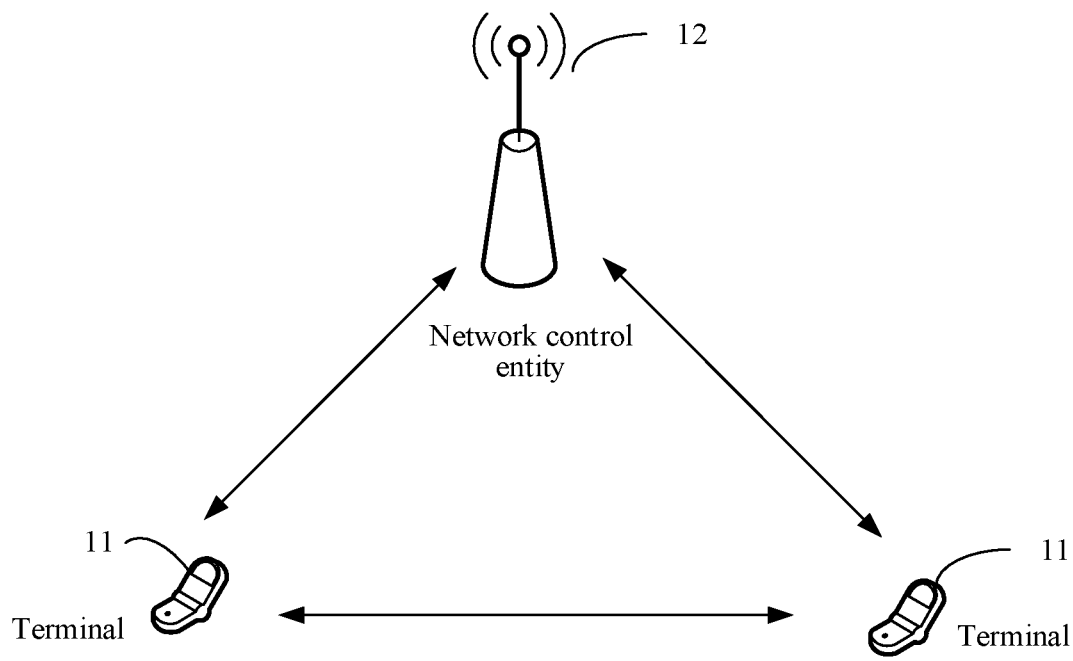
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a plurality of terminals 11 and a network control entity 12. The terminal 11 may be user equipment (User Equipment, UE) or another terminal device, for example, a terminal side device such as a mobile phone, a tablet personal computer (Tablet Personal Computer), a laptop computer (Laptop Computer), a personal digital assistant (Personal Digital Assistant, PDA), a mobile internet device (Mobile Internet Device, MID), a wearable device (Wearable Device), a robot, a vehicle-mounted terminal, a vehicle, a machine-type device, or the like. It should be noted that the terminal is not limited to any specific type in the embodiments of this disclosure. The terminals 11 can directly communicate with each other by using a PC5 interface. The terminals in direct communication may all be online or offline, or some devices may be online and some devices may be offline. The network control entity 12 may be a network-side control entity such as a proximity-based service function (ProSe Function), a V2X control function, a policy control function (Policy Control Function, PCF), or a UAS control function.

It should be noted that, in this embodiment of this disclosure, the network control entity in the 5G communication system and the network control entity in the 4G communication system are used as only examples, but the network control entity is not limited to any specific type.

Figure 2:
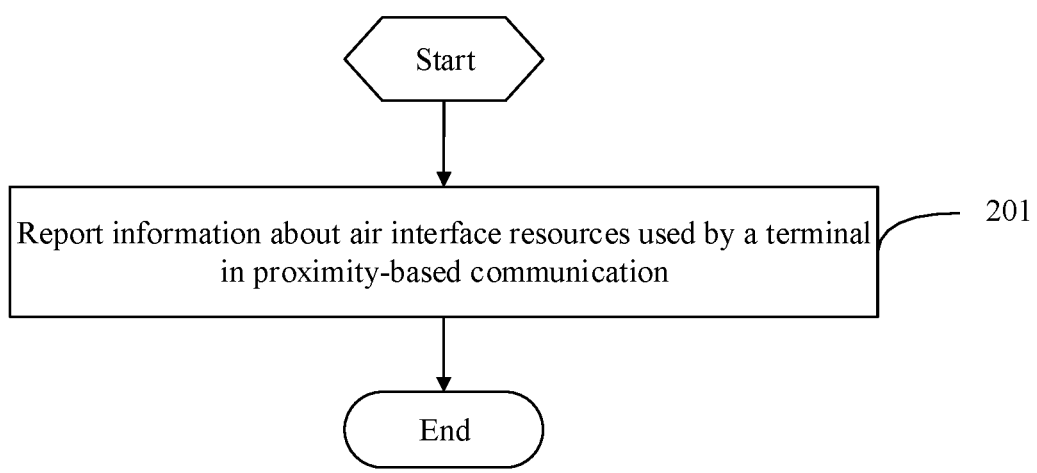
FIG. 2 is a flowchart of an information reporting method according to an embodiment of this disclosure.

FIG. 2 is a flowchart of an information reporting method according to an embodiment of this disclosure. The method is applied to a terminal. As shown in FIG. 2, the method includes the following step:

Step 201: Report information about air interface resources used by the terminal in proximity-based communication.

In this embodiment of this disclosure, the proximity-based communication may include, but is not limited to, the following communication:

ProSe direct communication (ProSe direct communication), V2X communication or UAS communication.

The V2X communication may be V2X communication in the 4G communication system (for example, LTE V2X PC5 communication) or may be V2X communication in the 5G communication system (for example, NR V2X PC5 communication).

Further, the proximity-based communication may be direct communication between terminals (direct communication for short), for example, communication between terminals by using a sidelink (Sidelink) of the PC5 interface.

In addition, the information about air interface resources used in the proximity-based communication may be information about the air interface resources used by the terminal in a proximity-based communication process. This information may be information that can directly reflect information about air interface resources consumed by the terminal in the proximity-based communication, such as the number, type, and the like of air interface resources used by the terminal.

The reporting may be performed during the proximity-based communication process or after the proximity-based communication process. Further, the reporting may be performed when the terminal is online or returns to a network coverage. In addition, the reporting may be reporting, to a network side (for example, the network control entity), the information about air interface resources used by the terminal in proximity-based communication.

In this embodiment of this disclosure, the information about air interface resources used by the terminal in the proximity-based communication is reported, so that the network side can charge the proximity-based communication of the terminal based on the information about air interface resources used by the terminal in the proximity-based communication. In other words, the information about air interface resources is used for charging on the network side. In this way, the charging accuracy of the proximity-based communication can be improved by reporting the information about air interface resources used by the terminal in the proximity-based communication.

It should be noted that, in this embodiment of this disclosure, a charging behavior of the network side is not limited. For example, the network side can comprehensively charge the terminal based on the information about air interface resources used by the terminal and an amount of data transmitted during the proximity-based communication. For another example, the network side can comprehensively charge the terminal based on the information about air interface resources used by the terminal, the amount of data transmitted during the proximity-based communication, and a time period of the proximity-based communication.

In an optional implementation, the information about air interface resources includes at least one of the following:
    a type of air interface resource and the number of air interface resources.

The type of air interface resource may be a type of air interface resource reported in step 201. In other words, the type of air interface resource reported may be indicated. The number of air interface resources may be the number of air interface resources reported in step 201. At least one of the type of air interface resource and the number of air interface resources may be reported, so that the network side can perform charging based on the type of air interface resource used by the terminal, or the number of air interface resources used by the terminal, or both the type and number of air interface resources used by the terminal, to improve the charging effect.

Optionally, the number of air interface resources includes:
    the number of air interface resources of each type of air interface resource.

The number of air interface resources of each type of air interface resource may be the number of air interface resources of each type of air interface resource in the air interface resources reported in step 201, so that the number of air interface resources is reported by air interface resource types, facilitating more accurate charging on the network side.

It should be noted that, the type of air interface resource may be dynamically indicated by the network control entity, may be pre-configured by the network control entity to the terminal, may be defined in a protocol, or the like.

Optionally, the type of air interface resource includes at least one of the following:
    frequency domain resources and time domain resources.

The frequency domain resources and time domain resources may be physical resources.

In this implementation, the type of air interface resource may include at least one of frequency domain resources and time domain resources, so that a specific type reported by the terminal can be indicated, and the number of at least one of the frequency domain resources and the time domain resources used by the terminal in the proximity-based communication can be further reported, thereby supporting more detailed reporting, and further improving charging accuracy.

Optionally, the frequency domain resources may include frequency domain resources of at least one spectrum resource type; and/or
    the time domain resources may include time domain resources of at least one spectrum resource type.

The at least one spectrum resource type may be dynamically indicated by the network control entity, may be pre-configured by the network control entity to the terminal, may be defined in a protocol, or the like.

In this implementation, the indicated or reported air interface resource type includes frequency domain resources of at least one spectrum resource type, and/or includes time domain resources of at least one spectrum resource type. In this way, reporting is implemented per frequency resource type, so that the reported information is more accurate, further improving charging accuracy. For example, the at least one spectrum resource type may include at least one of the following:
    licensed spectrum, unlicensed spectrum, and intelligent traffic system (Intelligent Traffic System, ITS) spectrum.

In this way, numbers of resources respectively used in the licensed spectrum, the unlicensed spectrum and the ITS spectrum may be reported to distinguish numbers of air interface resources in the licensed spectrum, the unlicensed spectrum, and the ITS spectrum, facilitating charging on the network side.

Optionally, the frequency domain resources may include frequency domain resources of at least one spectrum resource range; and/or
    the time domain resources include time domain resources of at least one spectrum resource range.

The at least one spectrum resource range may be dynamically indicated by the network control entity, may be pre-configured by the network control entity to the terminal, may be defined in a protocol, or the like.

In this implementation, the indicated or reported air interface resource type includes frequency domain resources of at least one spectrum resource range, and/or includes time domain resources of at least one spectrum resource range. In this way, reporting is implemented per frequency resource range used, so that the reported information is more accurate, further improving charging accuracy. For example, the at least one spectrum resource range includes at least one of the following:
    a first carrier and a first frequency band.

The first carrier and the first frequency band may be dynamically indicated by the network control entity, may be pre-configured by the network control entity to the terminal, may be defined in a protocol, or the like.

The first frequency band may include one or more frequency ranges, for example, at least one of a frequency range FR1, a frequency range FR2, a frequency range FR3, and a frequency range FR4. For example, in a 5G communication system, the FR1 may be 5G Sub-6 GHz (below 6 GHz) frequency band (for example, 450 MHz-6000 MHz), and the FR2 may be 5G millimeter-wave band (for example, 24250 MHz-52600 MHz). Further, the first frequency band may include one or more bands (Band). In addition, when the first frequency band includes a plurality of frequency ranges or bands, the frequency range or the number of air interface resources in the band used can be reported. Certainly, this is not limited. For example, the plurality of frequency ranges or bands can be used as a whole to report the number of resources used.

The first carrier may include one or more carriers. When the first carrier includes a plurality of carriers, the number of air interface resources used in the carrier may be reported. Certainly, this is not limited. For example, the plurality of carriers can be used as a whole to report the number of resources used.

As an optional implementation, the reporting information about air interface resources used by the terminal in proximity-based communication includes:
    reporting a usage information reporting list (usage information reporting list), where the usage information reporting list includes the information about air interface resources.

It should be noted that, in addition to the information about air interface resources, the usage information reporting list may also include other reporting information, for example, also include at least one of the following:
    Collection Period (Collection Period), Report Group Parameters (Report Group Parameters), Report Time Stamps of First Transmission And Reception (Report Time Stamps of First Transmission And Reception), Report Data Transmitted (Report Data Transmitted), Report Data Received (Report Data Received), Report Time Stamps Out Of Coverage (Report Time Stamps Out Of Coverage), Report Location In Coverage (Report Location In Coverage), and Report Radio Parameters (Report Radio Parameters).

Specific content that needs to be reported in the usage information reporting list can be configured by the network control entity. Certainly, this is not limited. For example, it can be defined by a protocol.

In this implementation, the usage information reporting list can be used to report the information about air interface resources used by the terminal in proximity-based communication.

Optionally, the type of air interface resource may be indicated in a binary coding format, that is, each type corresponds to one bit. For example, 8 bits are used as an example, and the type of air interface resource reported can be indicated as follows:

Bits (Bits)
8 7 6 5 4 3 2 1
0 0 0 0 0 0 0 1 Report Number PHY Resource_Authorized Fre
0 0 0 0 0 0 1 0 Report Number PHY Resource_Unauthorized Fre
0 0 0 0 0 1 0 0 NR CI Report Number PHY Resource_Itsfre
0 0 0 0 1 0 0 0 Report Number PHY Resource_Frequency_x
0 0 0 1 0 0 0 0 Report Number PHY Resource_Carrier_x
0 0 1 0 0 0 0 0 Report Number PHY Resource_Band_X Report Number PHY Resource_Authorized Fre indicates the number of frequency domain resources in a licensed spectrum used by the terminal in the proximity-based communication, Report Number PHY Resource_unAuthorized Fre indicates the number of frequency domain resources in an unlicensed spectrum used by the terminal in the proximity-based communication, NR CI Report Number PHY Resource_ITSFre indicates the number of frequency domain resources in an ITS spectrum used by the terminal in proximity-based communication, Report Number PHY Resource_Frequency_x indicates the number of frequency domain resources in a frequency range x used by the terminal in proximity-based communication, Report Number PHY Resource_Carrier_x indicates the number of frequency domain resources in a carrier x used by the terminal in proximity-based communication, and Report Number PHY Resource_Band_x indicates the number of frequency domain resources of a band x used by the terminal in proximity-based communication. It should be noted that the frequency range x indicates one or more frequency ranges, the carrier x indicates one or more carriers, and the band x indicates one or more bands.

In other words, different air interface resource types are indicated by different bits.

In addition, the unused bits in the foregoing example can be reserved.

Certainly, the foregoing description is only an example, and an indication manner is not limited in this embodiment of this disclosure. For example, other bit numbers such as 6 bits, 5 bits, and 4 bits may also be used to indicate the reported air interface resource type in another manner.

Figure 16:
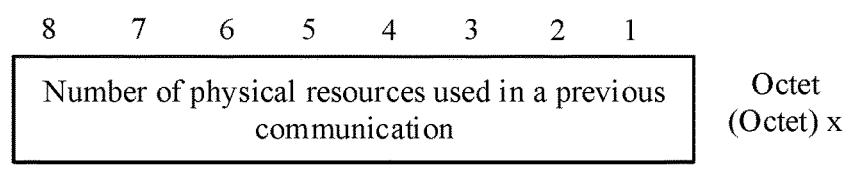
FIG. 16 is a schematic diagram of the number of air interface resources reporting format according to an embodiment of this disclosure.

In this implementation, the usage information reporting list can be used to report the number of air interface resources, and also indicate the type of air interface resource, so that the network side can accurately determine the number of resources of different types for accurate charging. In addition, the number of air interface resources of each type can be reported by using one byte (byte), for example, as shown in FIG. 16.

Certainly, the foregoing description is only an example, and a form for reporting the information about air interface resources is not limited in this embodiment of this disclosure.

Figure 3:
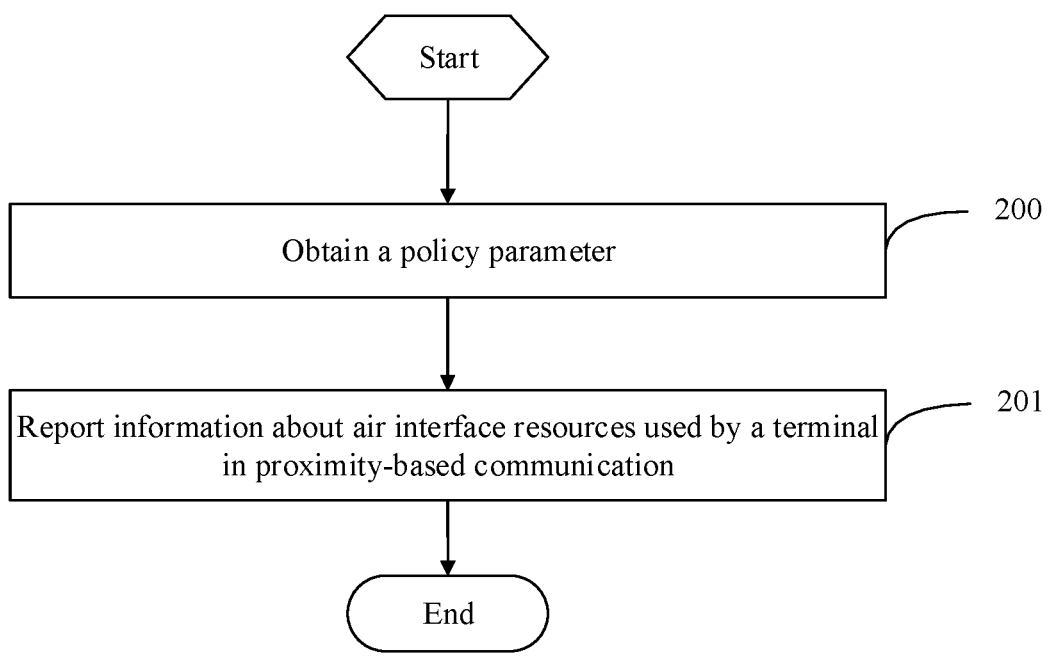
FIG. 3 is a flowchart of another information reporting method according to an embodiment of this disclosure.

As an optional implementation, before the reporting information about air interface resources used by the terminal in proximity-based communication, as shown in FIG. 3, the method further includes steps 200 and 201.

Step 200: Obtain a policy parameter, where the policy parameter is used to indicate a type of air interface resource reported by the terminal.

The obtaining a policy parameter may be receiving a policy parameter sent or pre-configured by a network control entity, or obtaining a policy parameter defined by a protocol.

In addition, the obtaining a policy parameter may be obtaining a policy parameter required for a service of the proximity-based communication during a service authorization procedure of a network.

In this implementation, the policy parameter can be used to indicate the type of air interface resource reported by the terminal, so that the terminal performs reporting based on the type indicated by the policy parameter, so as to avoid that the resource type reported by the terminal does not match the resource type required by the network side.

Optionally, the policy parameter includes:
usage information reporting configuration, where the usage information reporting configuration is used to indicate the type of air interface resource reported by the terminal.

The usage information reporting configuration (usage information reporting configuration) may indicate, in the form of a list, the type of air interface resource reported by the terminal. For example, the policy parameter includes a usage information reporting list (usage information reporting list), and this list is used to indicate the type of air interface resource reported by the terminal. Certainly, this is not limited.

It should be noted that, for the type of air interface resource in the obtained policy parameter, reference may be made to corresponding description of the type of air interface resource reported in step 201, and details are not repeated herein.

Figure 4:
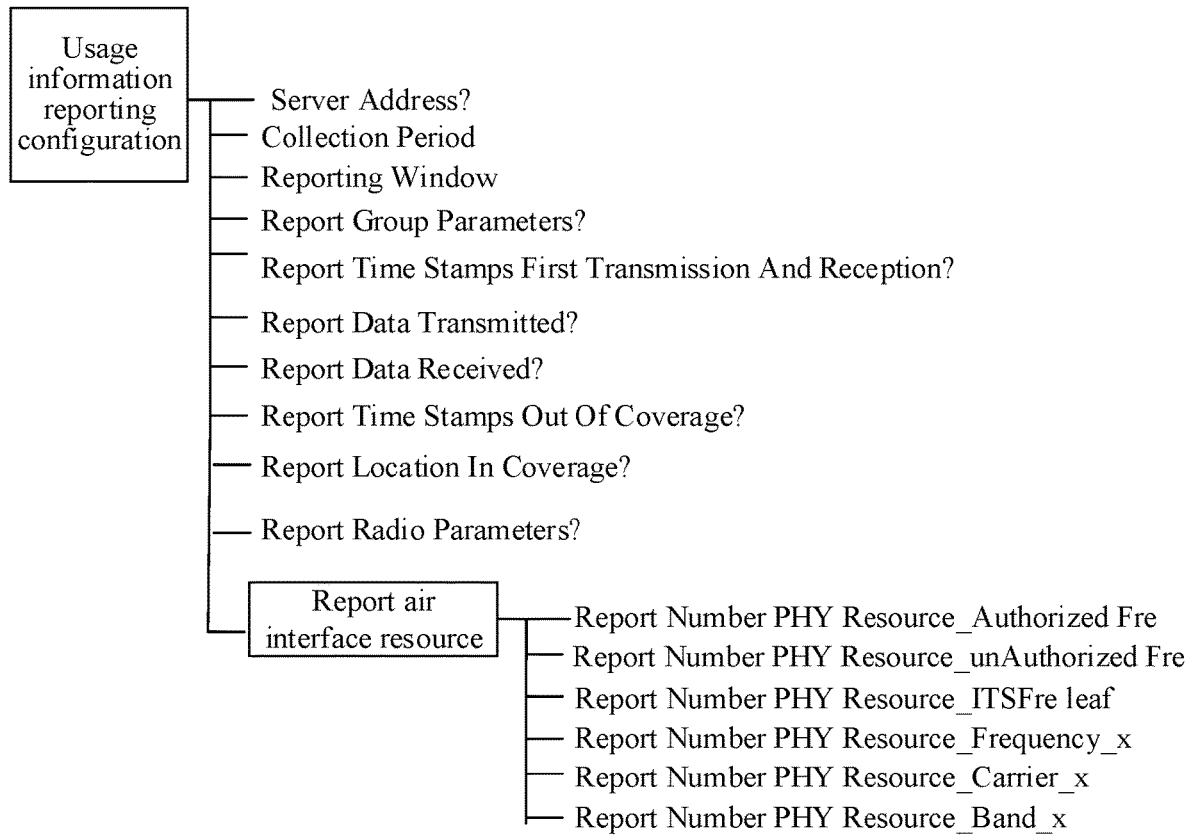
FIG. 4 is a schematic diagram of usage information reporting configuration according to an embodiment of this disclosure.

It should be noted that, in addition to indicating the type of air interface resource reported by the terminal, the usage information reporting configuration can also indicate another reporting type. For example, as shown in FIG. 4, the usage information reporting configuration can be used to indicate the following content:

Server Address (Server Address), Collection Period (Collection Period), Reporting Window (Reporting Window), Report Group Parameters (Report Group Parameters), Report Time Stamps First Transmission And Reception (Report Time Stamps First Transmission And Reception), Report Data Transmitted (Report Data Transmitted), Report Data Received (Report Data Received), Report Time Stamps Out Of Coverage (Report Time Stamps Out Of Coverage), Report Location In Coverage (Report Location In Coverage), Report Radio Parameters (Report Radio Parameters), and report air interface resources (for example, Report Number PHY Resource Report Number PHY Resource).

Further, the usage information reporting configuration can be used to indicate the type of air interface resource to be reported, for example:

Report Number PHY Resource_Authorized Fre (Report Number PHY Resource_Authorized Fre), Report Number PHY Resource_unAuthorized Fre (Report Number PHY Resource_unAuthorized Fre), Report Number PHY Resource_ITSFre leaf (Report Number PHY Resource_ITSFre leaf), Report Number PHY Resource_Frequency_x (Report Number PHY Resource_Frequency_x), Report Number PHY Resource_Carrier_x (Report Number PHY Resource_Carrier_x), and Report Number PHY Resource_Band_x (Report Number PHY Resource_Band_x).

It should be noted that, whether to report the content shown in FIG. 4 can be configured by using the usage information reporting configuration. For example, the usage information reporting configuration can be used to configure the terminal to report the number of frequency domain resources used in the licensed spectrum, but not to report the number of frequency domain resources used in the unlicensed spectrum; or can be used to configure the terminal to report the number of frequency domain resources used in the frequency range x, but not to report the number of frequency domain resources used in the carrier x and the number of frequency domain resources used in the band x; or can be used to configure the terminal to report the data transmitted, but not to report the data received.

It should be noted that "?" in FIG. 4 indicates that a corresponding parameter may be configured or may not be configured.

The following example describes how to configure the number of air interface resources which are physical resources.

The description of Report Number PHY Resource (Report Number PHY Resource) is as follows:

<X>/Usage Information reporting Configuration (Usage Information Reporting Configuration)/Report Number PHY Resource (Report Number PHY Resource):

Report Number PHY Resource Node indicates whether or not the terminal shall report the number of physical resources used for ProSe direct communication during the reporting period in the usage information (The Report Number PHY Resource Node indicates whether or not the UE shall report the number of PHY resources used for ProSe direct communication during the reporting period in the usage information).

When a value of Report Number PHY Resource (Report Number PHY Resource) is set to 0, it indicates that the terminal shall not report the number of physical resources used for ProSe direct communication during the reporting period in usage information. (0 Indicates that the UE shall not report the number of PHY resource used for ProSe direct communication during the reporting period in the usage information). When the value of Report Number PHY Resource (Report Number PHY Resource) is set to 1, it indicates that the terminal shall report the number of physical resources used for ProSe direct communication during the reporting period in the usage information. (1 Indicates that the UE shall report the number of PHY resource used for ProSe direct communication during the reporting period in the usage information). In addition, the default value 0 applies if this leaf is not provisioned (The default value 0 applies if this leaf is not provisioned).

The description of Report Number PHY ResourceAuthorized Fre (Report Number PHY Resource_Authorized Fre) is as follows:

<X>/Usage Information Reporting Configuration (Usage Information Reporting Configuration)/Report Number PHY Resource (Report Number PHY Resource)/Report Number PHY Resource_Authorized Fre (Report Number PHY Resource_Authorized Fre):

The Report Number PHY Resource_Authorized Fre leaf indicates whether the terminal shall report the number of physical resources of the licensed spectrum used for ProSe direct communication during the reporting period in the usage information (The Report Number PHY Resource_Authorized Fre leaf indicates whether or not the UE shall report the number of PHY resource of Authorized Frequency used for ProSe direct communication during the reporting period in the usage information).

When a value of Report Number PHY Resource_Authorized Fre (Report Number PHY Resource_Authorized Fre) is set to 0, it indicates that the terminal shall not report the number of physical resources of the licensed spectrum used for ProSe direct communication during the reporting period in the usage information (0 Indicates that the UE shall not report the number of PHY resource of Authorized Frequency used for ProSe direct communication during the reporting period in the usage information). When the value of Report Number PHY Resource_Authorized Fre (Report Number PHY Resource_Authorized Fre) is set to 1, it indicates that the terminal shall report the number of physical resources of the licensed spectrum used for ProSe direct communication during the reporting period in the usage information (1 Indicates that the UE shall report the number of PHY resource of Authorized Frequency used for ProSe direct communication during the reporting period in the usage information). In addition, the default value 0 applies if this leaf is not provisioned (The default value 0 applies if this leaf is not provisioned).

The description of Report Number PHY Resource_unAuthorized Fre (Report Number PHY Resource_unAuthorized Fre) is as follows:

<X>/Usage Information Reporting Configuration (Usage Information Reporting Configuration)/Report Number PHY Resource (Report Number PHY Resource)/Report Number PHY Resource_unAuthorized Fre (Report Number PHY Resource_unAuthorized Fre):

The Report Number PHY Resource_unAuthorizedFre leaf indicates whether the terminal shall report the number of physical resources of the unlicensed spectrum used for ProSe direct communication during the reporting period in the usage information (The Report Number PHY Resource_unAuthorizedFre leaf indicates whether or not the UE shall report the number of PHY resource of unAuthorized Frequency used for ProSe direct communication during the reporting period in the usage information).

When a value of Report Number PHY Resource_unAuthorized Fre (Report Number PHY Resource_unAuthorized Fre) is set to 0, it indicates that the terminal shall not report the number of physical resources of the unlicensed spectrum used for ProSe direct communication during the reporting period in the usage information (0 Indicates that the UE shall not report the number of PHY resource of unAuthorized Frequency used for ProSe direct communication during the reporting period in the usage information). When the value of Report Number PHY Resource_unAuthorized Fre (Report Number PHY Resource_unAuthorized Fre) is set to 1, it indicates that the terminal shall report the number of physical resources of the unlicensed spectrum used for ProSe direct communication during the reporting period in the usage information (1 Indicates that the UE shall report the number of PHY resource of unAuthorized Frequency used for ProSe direct communication during the reporting period in the usage information). In addition, the default value 0 applies if this leaf is not provisioned (The default value 0 applies if this leaf is not provisioned).

The description of Report Number PHY Resource_ITS Fre (Report Number PHY Resource_ITS Fre) is as follows:

<X>/Usage Information Reporting Configuration (Usage Information Reporting Configuration)/Report Number PHY Resource (Report Number PHY Resource)/Report Number PHY Resource_ITS Fre (Report Number PHY Resource_ITS Fre):

The Report Number PHY Resource_ITS Fre leaf indicates whether the terminal shall report the number of physical resources of the ITS spectrum used for ProSe direct communication during the reporting period in the usage information (The ReportNumberPHYResource_ITSFre leaf indicates whether or not the UE shall report the number of PHY resource of ITS Frequency used for ProSe direct communication during the reporting period in the usage information).

When a value of Report Number PHY Resource_ITS Fre (Report Number PHY Resource_ITS Fre) is set to 0, it indicates that the terminal shall not report the number of physical resources of the ITS spectrum used for ProSe direct communication during the reporting period in the usage information (0 Indicates that the UE shall not report the number of PHY resource of ITS Frequency used for ProSe direct communication during the reporting period in the usage information). When the value of Report Number PHY Resource_ITS Fre (Report Number PHY Resource_ITS Fre) is set to 1, it indicates that the terminal shall report the number of physical resources of the ITS spectrum used for ProSe direct communication during the reporting period in the usage information (1 Indicates that the UE shall report the number of PHY resource of ITS Frequency used for ProSe direct communication during the reporting period in the usage information). In addition, the default value 0 applies if this leaf is not provisioned (The default value 0 applies if this leaf is not provisioned).

The description of Report Number PHY Resource_Frequency_x (Report Number PHY Resource_Frequency_x) is as follows:

<X>/Usage Information Reporting Configuration (Usage Information Reporting Configuration)/Report Number PHY Resource (Report Number PHY Resource)/Report Number PHY Resource_Frequency_x (Report Number PHY Resource_Frequency_x):

The Report Number PHY Resource_Frequency_x leaf indicates whether the terminal shall report the number of physical resources of the frequency range x used for ProSe direct communication during the reporting period in the usage information (The Report Number PHY Resource_Frequency_x leaf indicates whether or not the UE shall report the number of PHY resource of Frequency_x used for ProSe direct communication during the reporting period in the usage information).

When a value of Report Number PHY Resource_Frequency_x (Report Number PHY Resource_Frequency_x) is set to 0, it indicates that the terminal shall not report the number of physical resources of the frequency range x used for ProSe direct communication during the reporting period in the usage information (0 Indicates that the UE shall not report the number of PHY resource of Frequency_x used for ProSe direct communication during the reporting period in the usage information). When the value of Report Number PHY Resource_Frequency_x (Report Number PHY Resource_Frequency_x) is set to 1, it indicates that the terminal shall report the number of physical resources of the frequency range x used for ProSe direct communication during the reporting period in the usage information (1 Indicates that the UE shall report the number of PHY resource of Frequency_x used for ProSe direct communication during the reporting period in the usage information). In addition, the default value 0 applies if this leaf is not provisioned (The default value 0 applies if this leaf is not provisioned).

The description of Report Number PHY Resource_Carrier_x (Report Number PHY Resource_Carrier_x) is as follows:

<X>/Usage Information Reporting Configuration (Usage Information Reporting Configuration)/Report Number PHY Resource (Report Number PHY Resource)/Report Number PHY Resource_Carrier_x (ReportNumberPHYResource_Carrier_x):

The Report Number PHY Resource_Carrier_x leaf indicates whether the terminal shall report the number of physical resources of the carrier x used for ProSe direct communication during the reporting period in the usage information (The Report Number PHY Resource_Carrier_x leaf indicates whether or not the UE shall report the number of PHY resource of Carrier_x used for ProSe direct communication during the reporting period in the usage information).

When a value of Report Number PHY Resource_Carrier_x (ReportNumberPHYResource_Carrier_x) is set to 0, it indicates that the terminal shall not report the number of physical resources of the carrier x used for ProSe direct communication during the reporting period in the usage information (0 Indicates that the UE shall not report the number of PHY resource of Carrier_x used for ProSe direct communication during the reporting period in the usage information). When the value of Report Number PHY Resource_Carrier_x (ReportNumberPHYResource_Carrier_x) is set to 1, it indicates that the terminal shall report the number of physical resources of the carrier x used for ProSe direct communication during the reporting period in the usage information (1 Indicates that the UE shall report the number of PHY resource of Carrier_x used for ProSe direct communication during the reporting period in the usage information). In addition, the default value 0 applies if this leaf is not provisioned (The default value 0 applies if this leaf is not provisioned).

The description of Report Number PHY Resource_Band_x (Report Number PHY Resource_Band_x) is as follows:

<X>/Usage Information Reporting Configuration (Usage Information Reporting Configuration)/Report Number PHY Resource (Report Number PHY Resource)/Report Number PHY Resource_Band_x (Report Number PHY Resource_Band_x):

The Report Number PHY Resource_Band_x leaf indicates whether the terminal shall report the number of physical resources of the band x used for ProSe direct communication during the reporting period in the usage information (The Report Number PHY Resource_Band_x leaf indicates whether or not the UE shall report the number of PHY resource of Band_x used for ProSe direct communication during the reporting period in the usage information).

When a value of Report Number PHY Resource_Band_x (Report Number PHY Resource_Band_x) is set to 0, it indicates that the terminal shall not report the number of physical resources of the band x used for ProSe direct communication during the reporting period in the usage information (0 Indicates that the UE shall not report the number of PHY resource of Band_x used for ProSe direct communication during the reporting period in the usage information). When the value of Report Number PHY Resource_Band_x (Report Number PHY Resource_Band_x) is set to 1, it indicates that the terminal shall report the number of physical resources of the band x used for ProSe direct communication during the reporting period in the usage information (1 Indicates that the UE shall report the number of PHY resource of Band used for ProSe direct communication during the reporting period in the usage information). In addition, the default value 0 applies if this leaf is not provisioned (The default value 0 applies if this leaf is not provisioned).

Figure 5:
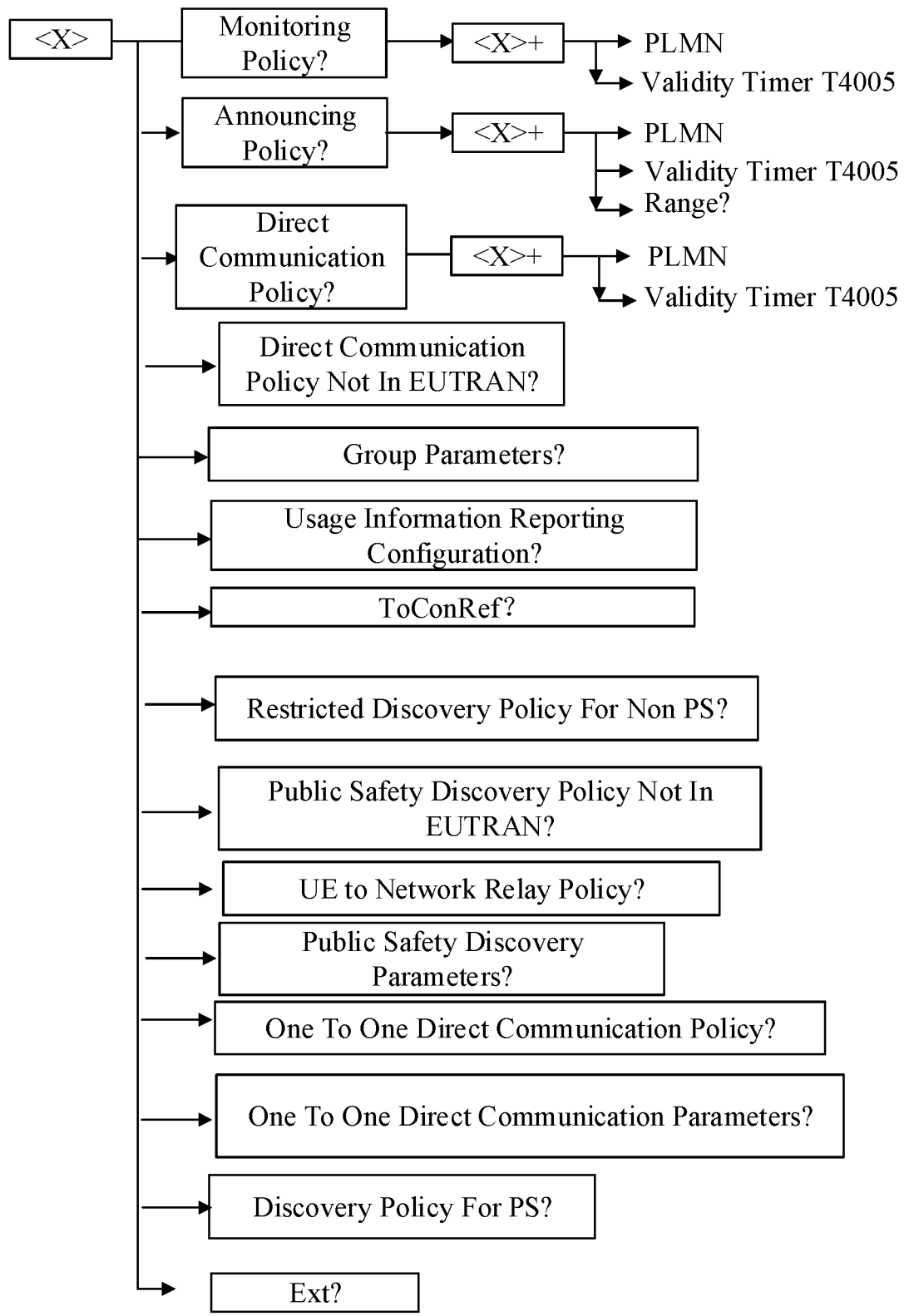
FIG. 5 is a schematic diagram of a configuration management object according to an embodiment of this disclosure.

It should be noted that the information reporting configuration can be configured by using ProSe Public Safety Direct Services Provisioning MO (The ProSe Public Safety Direct Services Provisioning MO). As shown in FIG. 5, a usage information reporting provisioning MO (the usage information reporting provisioning MO) is configured in the provisioning MO, which is specifically shown in FIG. 3 and will not be repeated herein. As shown in FIG. 5, the ProSe public safety direct service provisioning MO may include the following content:

Monitoring Policy (Monitoring Policy), where the Monitoring Policy may further include public land mobile network (PLMN) and Validity Timer (Validity Timer) T4005;

Announcing Policy (Announcing Policy), where the Announcing Policy may further include PLMN, Validity Timer (Validity Timer) T4005, and Range (Range);

Direct Communication Policy (Direct Communication Policy);

Direct Communication Policy Not In EUTRAN (Direct Communication Policy Not In EUTRAN);

Group Parameters (Group Parameters);

Usage Information Reporting Configuration (Usage Information Reporting Configuration);

ToConRef;

Restricted Discovery Policy For Non PS (Restricted Discovery Policy For Non PS);

Public Safety Discovery Policy Not In EUTRAN (Public Safety Discovery Policy Not In EUTRAN);

UE to Network Relay Policy (UE to Network Relay Policy);

Public Safety Discovery Parameters (Public Safety Discovery Parameters);

One To One Direct Communication Policy (One To One Direct Communication Policy);

One To One Direct Communication Parameters (One To One Direct Communication Parameters);

Discovery Policy For PS (Discovery Policy For PS); and

Ext (Ext).

It should be noted that "?" in FIG. 5 indicates that a corresponding parameter may be configured or may not be configured.

As an optional implementation, the reporting information about air interface resources used by the terminal in proximity-based communication includes:

reporting, to a network control entity, the information about air interface resources used by the terminal in proximity-based communication, where in a case that the proximity-based communication is ProSe direct communication, the network control entity may be a ProSe function (ProSe function); or in a case that the proximity-based communication is V2X communication, the network control entity may be a V2X control function (V2X CF) or a PCF; or in a case that the proximity-based communication is UAS communication, the network control entity may be a UAS control function.

It should be noted that the obtaining a policy parameter is receiving a policy parameter sent by the network control entity. For example, when a service of the proximity-based communication is ProSe direct communication, a control entity corresponding to the network is a ProSe function; and the corresponding policy parameter configuration can be configured by using a provisioning management object (Provisioning Management object, Provisioning MO) of a corresponding service on a PC3 interface between the terminal and the ProSe function.

For another example, when the service of the proximity-based communication is LTE V2X PC5 communication, the control entity corresponding to the network is a V2X CF; and the corresponding policy parameter configuration can be configured by using a provisioning MO of a corresponding service on a V3 interface between UE and the V2X CF.

For another example, when the service of the proximity-based communication is NR V2X PC5 communication, the control entity corresponding to the network is a PCF, and the corresponding policy parameter configuration can be completed by using a parameter transmitted between the UE and the PCF; or when the service of the proximity-based communication is NR V2X PC5 communication, another control entity corresponding to the network is a V2X CF, and the corresponding policy parameter configuration can be configured by using a provisioning MO of a corresponding service on the V3 interface between UE and the V2X CF.

In an optional implementation, the proximity-based communication includes but is not limited to any one of the following:

one-to-many proximity-based communication in network coverage;

one-to-one proximity-based communication in network coverage;

one-to-many proximity-based communication out of network coverage; and one-to-one proximity-based communication out of network coverage.

This implementation may be applied to a usage information reporting procedure after proximity-based communication in the scenario of one-to-many direct communication out of network coverage (One to many direct communication out of coverage). In this scenario, a procedure of reporting the number of air interface resources used by the terminal may be as follows:

the terminal performs one-to-many direct communication as defined in TS 23.303 [238] (UE performs one-to-many Direct Communication as defined in TS 23.303 [238]);

when the terminal determines that a reporting criterion is met, the terminal creates a corresponding usage information report according to the pre-configuration (When the UE decides that reporting criteria are met, according to the pre-configuration, the UE create the corresponding usage information report); or the terminal stores usage information when the terminal is out of E-UTRAN coverage and has no connection to the HPLMN ProSe function (The UE stores the usage information, when the UE is out of E-UTRAN coverage and has no connection to the HPLMN ProSe Function), where it should be noted that the usage information is stored in a secure environment in the terminal (The usage information is stored in a secure environment in the UE);

when the terminal comes back to the E-UTRAN coverage, it triggers reporting of the usage information (When the UE comes back to E-UTRAN coverage, it will trigger the reporting of the usage information); and the terminal reports the usage information to the ProSe function according to the pre-configuration or new configuration of the HPLMN ProSe function (UE sends the usage information report to the ProSe Function, according to the pre-configuration or new configuration from the HPLMN ProSe Function).

The implementation may be applied to a usage information reporting procedure after proximity-based communication in the scenario of one-to-many proximity-based communication in network coverage (One to many direct communication in coverage). In this scenario, a procedure of reporting the number of air interface resources used by the terminal may be as follows:

the terminal performs one-to-many direct communication as defined in TS 23.303 [238] (UE performs one-to-many Direct Communication as defined in TS 23.303 [238]);

when the terminal decides that a reporting criterion is met according to the configuration in step 1, and the connection to the ProSe Function is available, the UE triggers the usage reporting procedure (When the UE decides that reporting criteria are met, according to the configuration in step 1, and the connection to the ProSe Function is available, the UE triggers the usage reporting procedure), where it should be noted that the step 1 is the step of configuring a policy parameter; and it should be noted that the terminal provides a connection to the HPLMN ProSe function as specified in TS 23.303 [238] (The UE is provided a connection to the HPLMN ProSe Function as specified in TS 23.303 [238]); and the terminal reports the usage information to the ProSe function according to the configuration in step 1 (UE sends the usage information report to the ProSe Function, according to the configuration in step 1), where it should be noted that the step 1 is the step of configuring a policy parameter.

The implementation may be applied to a usage information reporting procedure after proximity-based communication in the scenario of one-to-one proximity-based communication in network coverage (One to one direct communication in coverage). In this scenario, a procedure of reporting the number of air interface resources used by the terminal in this scenario may be as follows:

when a terminal 1 determines that reporting criteria are met, the terminal 1 creates a corresponding usage information report according to the pre-configuration (When the UE-1 decides that reporting criteria are met, according to the pre-configuration, the UE creates the corresponding usage information report), where it should be noted that both the terminal 1 and terminal 2 can determine whether the reporting criterion is met and trigger the usage reporting procedure (Both UE-1 and UE-2 can decide that reporting criteria are met and trigger the usage reporting procedure); and upon reception of a disconnect response from the terminal 2, the terminal 1 triggers the usage reporting procedure, and the terminal 1 sends the usage information report to the ProSe function (Upon reception of the Disconnect Response from UE-2, the UE-1 triggers the usage reporting procedure. UE-1 sends the usage information report to the ProSe Function).

The implementation may be applied to a usage information reporting procedure after proximity-based communication in the scenario of one-to-one direct communication out of network coverage (One to one direct communication out of coverage). In this scenario, a procedure of reporting the number of air interface resources used by the terminal may be as follows:

When the terminal 1 decides that a reporting criterion is met, the terminal 1 creates a corresponding usage information report according to the pre-configuration, and when uE1 decides that the reporting criteria are met, the uE1 creates a corresponding usage information report according to the pre-configuration;

the terminal 1 stores usage information when the terminal 1 is out of E-UTRAN coverage and has no connection to the HPLMN ProSe function (The UE-1 stores the usage information, when the UE-1 is out of E-UTRAN coverage and has no connection to the HPLMN ProSe Function), where it should be noted that the usage information is stored in a secure environment in the terminal 1 (The usage information is stored in a secure environment in the UE-1); and when the terminal 1 comes back to the E-UTRAN coverage, it triggers the reporting of the usage information (When the UE-1 comes back to E-UTRAN coverage, it will trigger the reporting of the usage information), where it should be noted that both the terminal 1 and terminal 2 can determine the reporting criterion, store the usage information, and trigger the reporting when they are out of coverage (Both UE-1 and UE-2 can decide that reporting criteria, store the usage information and trigger the reporting when out of coverage).

It should be noted that the foregoing description only uses the ProSe function as an example. In other services, the ProSe function can be replaced with the V2X function, the UAS function or the PCF.

It should be noted that, in this embodiment of this disclosure, a reporting occasion for the terminal to report the number of air interface resources is not limited. For example, the terminal may perform reporting based on configuration in the policy parameter, or the terminal may decide to perform reporting by itself, or the terminal may perform reporting based on a protocol.

In addition, in this embodiment of this disclosure, after the network control entity receives the number of air interface resources reported by the terminal, a charging data function (Charging Data Function, CDF) in the network control entity can trigger a charging data request (triggers the Charging Data Request) based on the information reported by the terminal, for example, the control entity sends the charging data request to the corresponding CDF (The control Function sends the Charging Data Request to the corresponding CDF), where the charging data request may include the number of air interface resources reported by the terminal. After that, the CDF and a billing domain (billing domain) can interact to complete charging for the proximity-based communication of the terminal. It should be noted that, in the 5G communications system, the CDF can be replaced with a charging function (Charging Function, CHF), that is, for the 5G communications system, functions of the CDF can be implemented by using the CHF.

In this embodiment of this disclosure, the information about air interface resources used by the terminal in the proximity-based communication is reported, so that the network side can perform charging based on the information about air interface resources used by the terminal in the proximity-based communication, thereby improving the charging accuracy of the proximity-based communication.

Figure 6:
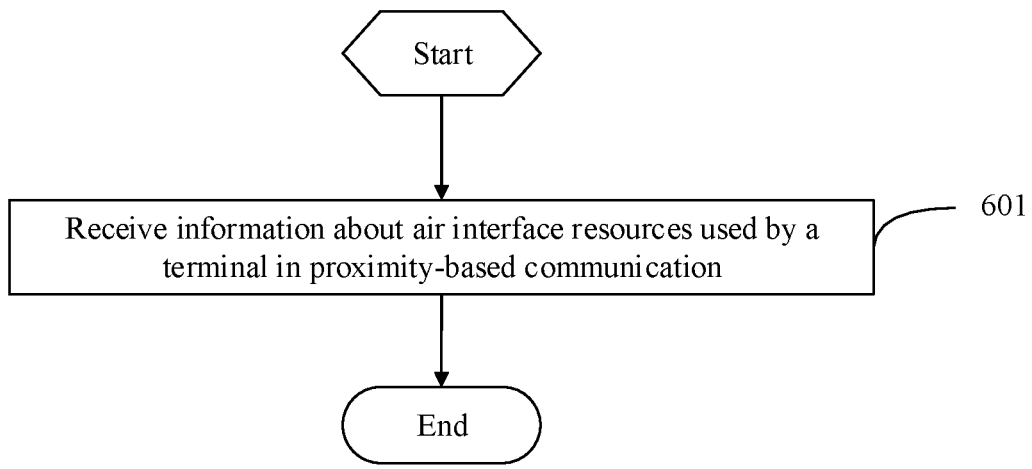
FIG. 6 is a flowchart of an information receiving method according to an embodiment of this disclosure.

FIG. 6 is a flowchart of an information receiving method according to an embodiment of this disclosure. The method is applied to a network control entity. As shown in FIG. 6, the method includes the following steps.

Step 601: Receive information about air interface resources used by a terminal in proximity-based communication.

Optionally, the information about air interface resources includes at least one of the following:
 a type of air interface resource and the number of air interface resources.

Optionally, the number of air interface resources includes:
 the number of air interface resources of each type of air interface resource.

Optionally, the type of air interface resource includes at least one of the following:
 frequency domain resources and time domain resources.

Optionally, the frequency domain resources include frequency domain resources of at least one spectrum resource type; and/or
 the time domain resources include time domain resources of at least one spectrum resource type.

Optionally, the at least one spectrum resource type includes at least one of the following:
 licensed spectrum, unlicensed spectrum, and intelligent traffic system ITS spectrum.

Optionally, the frequency domain resources include frequency domain resources of at least one spectrum resource range; and/or
 the time domain resources include time domain resources of at least one spectrum resource range.

Optionally, the at least one spectrum resource range includes at least one of the following:
 a first carrier and a first frequency band.

Optionally, the receiving information about air interface resources used by a terminal in proximity-based communication includes:
 receiving a usage information reporting list, where the usage information reporting list includes the information about air interface resources.

Optionally, the usage information reporting list further includes:
 indication information used to indicate the reported air interface resource type.

Figure 7:
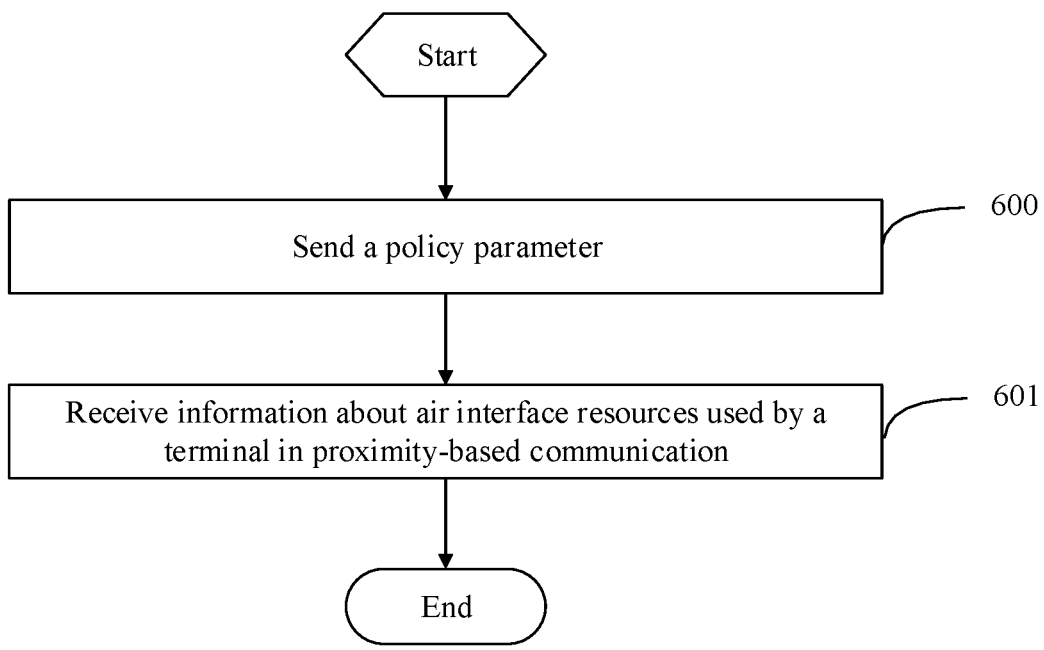
FIG. 7 is a flowchart of another information receiving method according to an embodiment of this disclosure.

Optionally, before the receiving information about air interface resources used by a terminal in proximity-based communication, as shown in FIG. 7, the method further includes steps 600 and 601.

Step 600: Send a policy parameter, where the policy parameter is used to indicate a type of air interface resource reported by the terminal.

Optionally, the policy parameter includes:
 usage information reporting configuration, where the usage information reporting configuration is used to indicate the type of air interface resource reported by the terminal.

Optionally, in a case that the proximity-based communication is ProSe direct communication, the network control entity is a ProSe function; or
 in a case that the proximity-based communication is V2X communication, the network control entity is a V2X control function or a PCF; or
 in a case that the proximity-based communication is UAS communication, the network control entity is a UAS control function.

Optionally, the proximity-based communication includes one of the following:
 one-to-many proximity-based communication in network coverage;
 one-to-one proximity-based communication in network coverage;
 one-to-many proximity-based communication out of network coverage; and
 one-to-one proximity-based communication out of network coverage.

It should be noted that this embodiment is used as an implementation of a network control entity corresponding to the embodiment shown in FIG. 2. For specific implementation, reference may be made to the relevant descriptions about the embodiment shown in FIG. 2. To avoid repetition, details are not described in this embodiment. However, a same beneficial effect can also be achieved.

The following uses proximity-based communication in 4G and 5G communication systems as examples for description.

Embodiment 1

Figure 8:
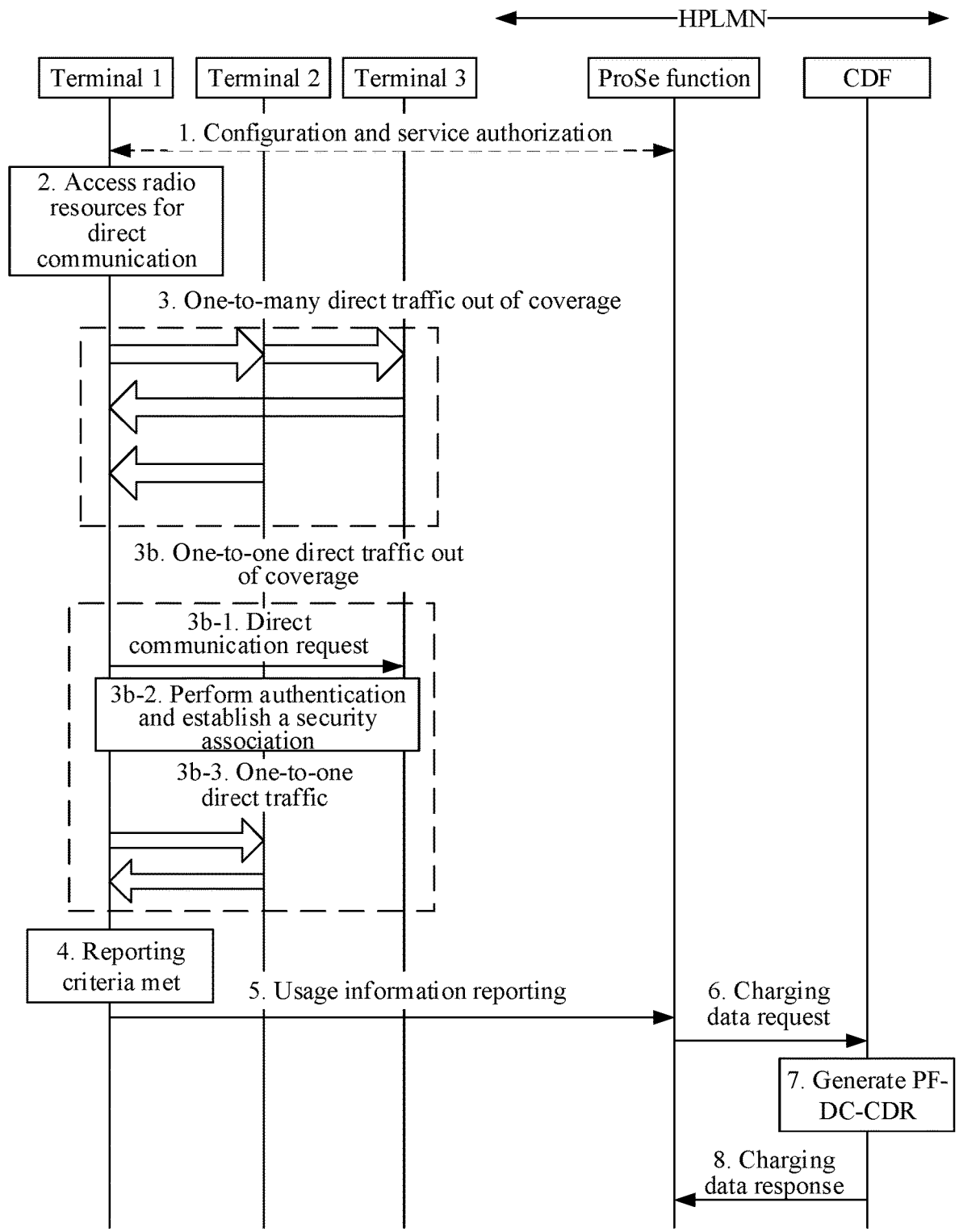
FIG. 8 is a schematic diagram of an information reporting method according to an embodiment of this disclosure.

This embodiment shows configuration for an evolved packet system (Evolved Packet System, EPS), which can be applied to D2D, V2X, and UAS services. As shown in FIG. 8, the following steps are included.
 Step 1: A ProSe function performs service authorization and parameter pre-configuration for proximity-based communication of a terminal (Configuration and Service Authorization).
 Step 2: The terminal uses a radio resource for direct communication (Access radio resources for direct communication).
 Step 3: Perform one-to-many direct communication out of a network coverage area (One-to-many direct traffic out of coverage).
 Step 3b: Perform one-to-one direct communication out of network coverage (One-to-many direct traffic out of coverage).
 Step 3b-1: Terminal 1 sends a direct communication request (Direct Communication Req).
 Step 3b-2: Perform authentication and establish a security association between terminals (Authentication and establish the security association);
 Step 3b-3: Perform one-to-one direct communication between terminals (one-to-one direct traffic).
 Step 4: A reporting criterion is met (Reporting criteria met).
 Step 5: The terminal reports usage information (Usage information reporting), namely, the number of air interface resources used in the embodiments shown in FIG. 2 and FIG. 6.
 Step 6: The ProSe function sends a charging data request (Charging Data Request) to a CDF.
 Step 7: The CDF generates direct communication charging data in the ProSe function (Direct communication charging data in ProSe Function, PF-DC-CDR).
 Step 8: The CDF returns a charging data response (Charging Data Response) to the ProSe function.

It should be noted that the ProSe function is only used as an example in FIG. 8. In this embodiment, the ProSe function can be replaced with a V2X function or a UAS function, that is, the V2X function or UAS function can be used to perform service authorization and a parameter pre-configuration procedure for the terminal to perform proximity-based communication.

Service authorization provided by the ProSe function of the HPLMN for direct communication includes (The service authorization provided by the ProSe Function of the HPLMN for ProSe direct communication indicates):

whether the terminal is authorized to perform ProSe direct communication when not served by E-UTRAN, and if so, a required radio parameter to be used for ProSe direct communication in absence of E-UTRAN (whether the UE is authorised to perform ProSe direct communication when not served by E-UTRAN, and if so, the required radio parameters to be used for ProSe direct communication when not served by E-UTRAN);

ProSe direct communication policy parameters (the ProSe direct communication policy parameters);

a list of PLMNs in which the terminal is authorized to use direct communication when served by E-UTRAN (the list of PLMNs in which the UE is authorised to use direct communication when served by E-UTRAN); and usage information reporting configuration (the usage information reporting configuration).

A corresponding ProSe public safety direct service provisioning management object (The ProSe Public Safety Direct Services Provisioning MO) is shown in FIG. 5.

In this embodiment, the usage information reporting configuration includes the air interface resources used by the terminal in a proximity-based communication process, for example, the number of physical resources used for proximity-based communication, where the number of physical resources may alternatively be reported per frequency resource type, for example, licensed spectrum, unlicensed spectrum, and ITS spectrum; or reported per frequency range, for example, FR1 and FR2; or the number of physical resources used is reported per carrier (per carrier) or per band (per band).

A corresponding usage information reporting provisioning management object (the usage information reporting provisioning MO) may be shown in FIG. 4, which will not be repeated herein.

Embodiment 2

Figure 9:
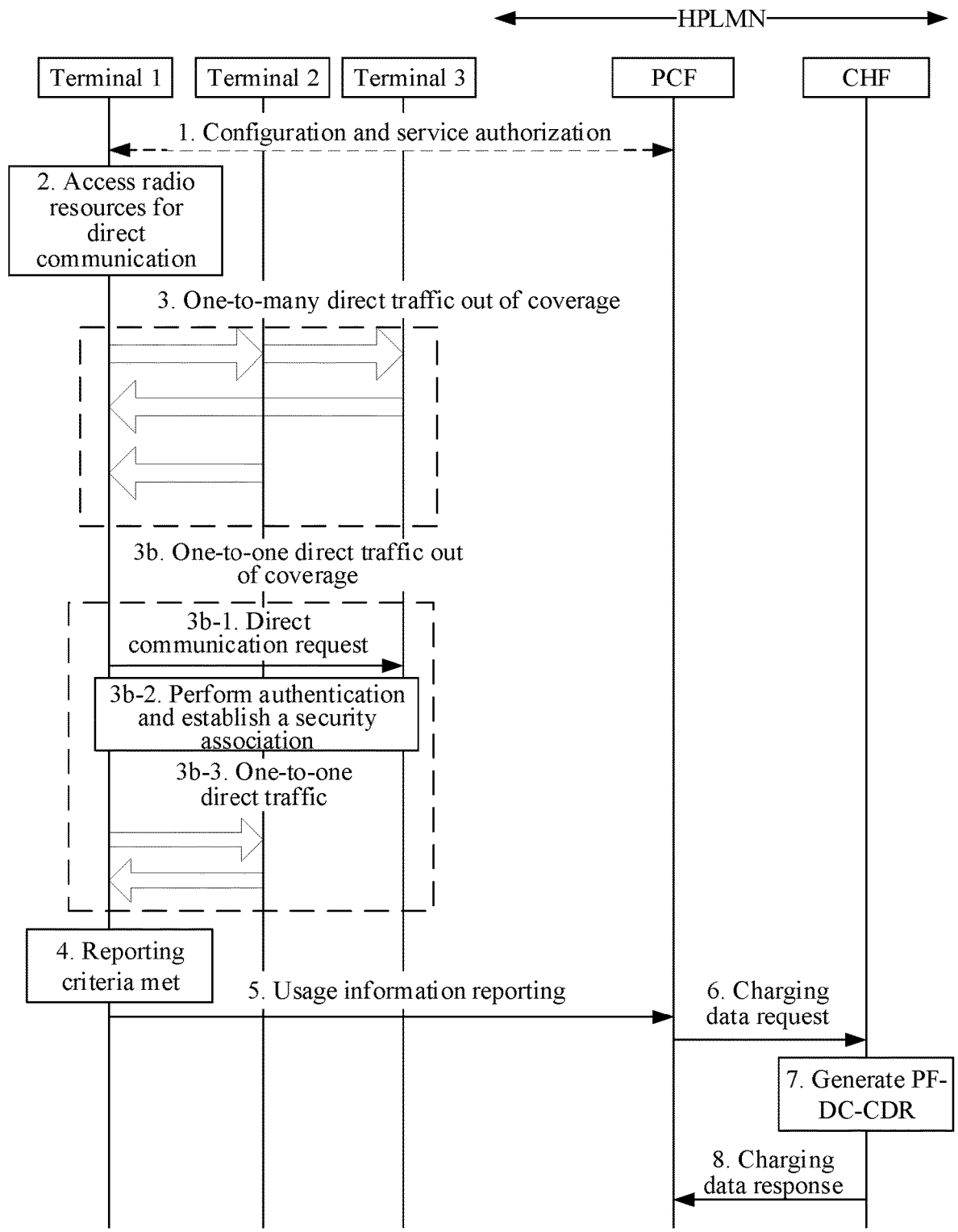
FIG. 9 is a schematic diagram of another information reporting method according to an embodiment of this disclosure.

This embodiment shows a 5G configuration, which can be applied to D2D, V2X, and UAS services, as shown in FIG. 9.

It should be noted that the corresponding description of embodiment 1 can be used in this embodiment, which will not be repeated herein. This embodiment is different from embodiment 1 in that the ProSe function in embodiment 1 corresponds to the PCF or UAS function in 5G, and the CDF corresponds to the CHF in 5G.

In this embodiment, the PCF or UAS function may perform service authorization and a parameter pre-configuration procedure for the terminal to perform proximity-based communication.

Configuration parameters in 5G can also be in a binary coding format.

For example, the usage information reporting configuration includes the air interface resources used by the terminal in a proximity-based communication procedure;

the number of physical resources used for proximity-based communication, where the number of physical resources may alternatively be reported per frequency resource type, for example, licensed spectrum, unlicensed spectrum, and ITS spectrum; or reported per frequency range, for example, FR1 and FR2; or the number of physical resources used is reported per carrier (per carrier) or per band (per band).

An example of the corresponding coding format is shown in the following table.

The following codes indicate a type of Report Number PHY Resource (Report Number PHY Resource) (Type of Report Number PHY Resource).

Bits 8 7 6 5 4 3 2 1

0 0 0 0 0 0 0 1 Report Number PHY Resource_AuthorizedFre 0 0 0 0 0 0 1 0 Report Number PHY Resource_unAuthorizedFre 0 0 0 0 0 1 0 0 NR CI Report Number PHY Resource_ITSFre leaf 0 0 0 0 1 0 0 0 Report Number PHY Resource_Frequency_x 0 0 0 1 0 0 0 0 Report Number PHY Resource_Carrier_x 0 0 1 0 0 0 0 0 Report Number PHY Resource_Band_x;

All other values are reserved.

For the foregoing configuration manner, reference may be made to the corresponding description of the embodiment shown in FIG. 2, and details are not repeated herein.

In addition, when the terminal reports usage information, in addition to reporting Type of Report Number PHY Resource (Type of Report Number PHY Resource), the number of physical resources of this type used also needs to be reported.

Embodiment 3

This embodiment describes that a terminal reports usage information (namely, number of air interface resources used) in EPS, which can be applied to D2D, V2X, and UAS services. A specific process is shown in FIG. 8 and will not be repeated herein.

This embodiment mainly describes step 5 shown in FIG. 8. The terminal can report usage information to the ProSe function, the V2X function, or the UAS function.

A scenario in this embodiment is applicable to, but not limited to, usage information reporting procedures performed after proximity-based communication in the following four scenarios:

one-to-many proximity-based communication in network coverage;

one-to-one proximity-based communication in network coverage;

one-to-many proximity-based communication out of network coverage; and one-to-one proximity-based communication out of network coverage.

For reporting in the foregoing four scenarios, reference may be made to the corresponding description of the embodiment shown in FIG. 2, and details are not repeated herein.

Embodiment 4

This embodiment describes that a terminal reports usage information (namely, number of air interface resources used) in 5G, which can be applied to D2D, V2X, and UAS services. A specific process is shown in FIG. 9 and will not be repeated herein. This embodiment is different from Embodiment 3 in that the ProSe function in Embodiment 3 corresponds to the PCF or UAS function in 5G, and the CDF corresponds to the CHF in 5G.

Embodiment 5

The billing domain (billing domain) charges for the air interface resources used, based on the information reported by the CDF or CHF. This is applicable to the proximity-based communication services in 4G, 5G, or later evolved systems.

This embodiment of this disclosure may be implemented as follows.

During a service authorization procedure of a network, a terminal obtains a policy parameter required for service communication, where the policy parameter includes a usage information reporting list (usage information reporting list). Specifically, the usage information reporting list further includes a type of an air interface resource such as frequency and time domain resources used by the terminal during proximity-based communication, for example, including the number of physical resources used in proximity-based communication, and the like.

For example, in the policy parameter, an indication of whether to report the frequency parameter 1 and frequency parameter 2 is set to 1, meaning that reporting is required.

The services include, but are not limited to, D2D (namely, ProSe, proximity-based service), V2X, UAS, and other similar proximity-based services.

The service authorization and parameter configuration procedures are completed by a control entity of a related service in the network.

When the service is ProSe direct communication (ProSe direct communication), a control entity corresponding to the network is a ProSe function; and the corresponding parameter configuration can be configured by using a provisioning management object (Provisioning MO) of the corresponding service on a PC3 interface between the terminal and the ProSe function.

When the service is LTE V2X PC5 communication, the control entity corresponding to the network is a V2X CF; and the corresponding parameter configuration can be configured by using a provisioning MO of the corresponding service on a V3 interface between the UE and the V2X CF.

When the service is NR V2X PC5 communication, the control entity corresponding to the network is a PCF, and the corresponding parameter configuration can be configured by using a parameter transmitted between the UE and the PCF. Optionally, another control entity corresponding to the network is a V2X CF, and the corresponding parameter configuration can be configured by using a provisioning MO of the corresponding service on the V3 interface between the UE and the V2X CF.

The air interface resources used by the terminal in the proximity-based communication process may include:
  the number of physical resources used for proximity-based communication, where the number of physical resources may alternatively be reported per frequency resource type, for example, licensed spectrum, unlicensed spectrum, and ITS spectrum; or reported per frequency range, for example, FR1 or FR2; or
  the number of physical resources is reported per carrier or per band.

In a case that the terminal is online or comes back to the network coverage during or after the service communication process, the terminal reports a usage information reporting list (usage information reporting list) to the network control entity. The usage information reporting list includes an air interface resource such as frequency and time domain resources used by the terminal during proximity-based communication, for example, including the number of physical resources used for proximity-based communication, and the like.

The related service in the network is performed by the control entity.

When the service is ProSe direct communication (ProSe direct communication), the control entity corresponding to the network is a ProSe function.

When the service is LTE V2X PC5 communication, the control entity corresponding to the network is a V2X CF.

When the service is NR V2X PC5 communication, the control entity corresponding to the network is a V2X CF; and the corresponding parameter configuration can be configured by using a provisioning MO of the corresponding service on a V3 interface between the UE and the V2X CF.

When the service is NR V2X PC5 communication, the control entity corresponding to the network is a PCF. Optionally, another control entity corresponding to the network is a V2X CF.

The air interface resources used by the terminal in the proximity-based communication process may include:
  the number of physical resources used for proximity-based communication, where the number of physical resources may alternatively be reported per frequency resource type, for example licensed spectrum, unlicensed spectrum, and ITS spectrum; or reported per frequency range, for example, FR1 and FR2; or
  the number of physical resources is reported per carrier or per band.

The CDF in the network control entity can trigger a charging data request (triggers the Charging Data Request) based on the information reported by the terminal. For example, the control entity sends the charging data request to the corresponding CDF (The control Function sends the Charging Data Request to the corresponding CDF).

The charging data request includes frequency resources used reported by the terminal.

The CDF interacts with the billing domain (billing domain).

In this embodiment of this disclosure, charging based on air interface resources used is supported in proximity-based communication.

Figure 10:
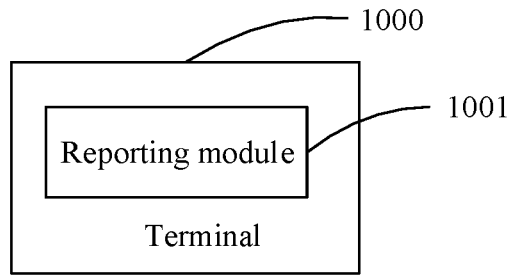
FIG. 10 is a structural diagram of a terminal according to an embodiment of this disclosure.

FIG. 10 is a structural diagram of a terminal according to an embodiment of this disclosure. As shown in FIG. 10, the terminal 1000 includes:
  a reporting module 1001, configured to report information about air interface resources used by the terminal in proximity-based communication.

Optionally, the information about air interface resources includes at least one of the following:
  a type of air interface resource and the number of air interface resources.

Optionally, the number of air interface resources includes:
  the number of air interface resources of each type of air interface resource.

Optionally, the type of air interface resource includes at least one of the following:
  frequency domain resources and time domain resources.

Optionally, the frequency domain resources include frequency domain resources of at least one spectrum resource type; and/or the time domain resources include time domain resources of at least one spectrum resource type.

Optionally, the at least one spectrum resource type includes at least one of the following:

licensed spectrum, unlicensed spectrum, and ITS spectrum.

Optionally, the frequency domain resources include frequency domain resources of at least one spectrum resource range; and/or the time domain resources include time domain resources of at least one spectrum resource range.

Optionally, the at least one spectrum resource range includes at least one of the following:

a first carrier and a first frequency band.

Optionally, the reporting information about air interface resources used by the terminal in proximity-based communication includes:

reporting a usage information reporting list, where the reported usage information reporting list includes the information about air interface resources.

Figure 11:
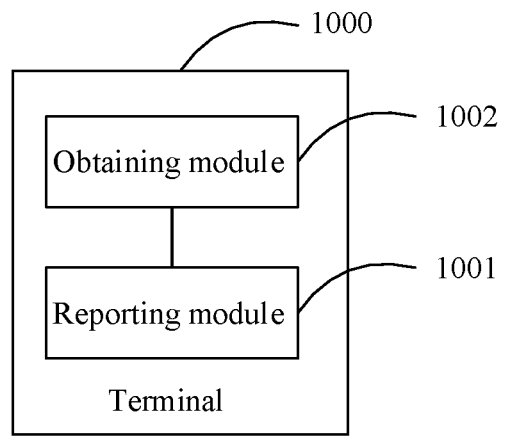
FIG. 11 is a structural diagram of another terminal according to an embodiment of this disclosure.

Optionally, as shown in FIG. 11, the terminal 1000 further includes:

an obtaining module 1002, configured to obtain a policy parameter, where the policy parameter is used to indicate a type of air interface resource reported by the terminal.

Optionally, the policy parameter includes:

usage information reporting configuration, where the usage information reporting configuration is used to indicate the type of air interface resource reported by the terminal.

Optionally, the reporting module 1001 is configured to report, to a network control entity, the information about air interface resources used by the terminal in proximity-based communication.

Optionally, in a case that the proximity-based communication is ProSe direct communication, the network control entity is a ProSe function; or optionally, in a case that the proximity-based communication is vehicle to everything V2X communication, the network control entity is a V2X function or a PCF; or optionally, in a case that the proximity-based communication is UAS communication, the network control entity is a UAS control function.

Optionally, the proximity-based communication includes one of the following:

one-to-many proximity-based communication in network coverage;

one-to-one proximity-based communication in network coverage;

one-to-many proximity-based communication out of network coverage; and one-to-one proximity-based communication out of network coverage.

The terminal according to this embodiment of this disclosure can implement the processes implemented by the terminal in the method embodiment in FIG. 2. To avoid repetition, details are not described herein again. In addition, the charging accuracy of the proximity-based communication can be improved.

Figure 12:
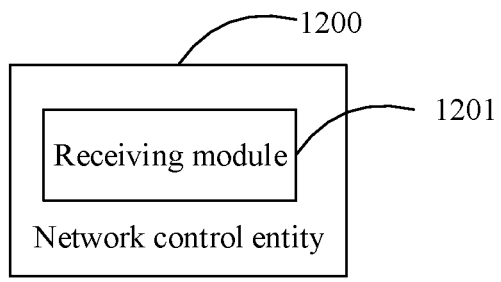
FIG. 12 is a structural diagram of a network control entity according to an embodiment of this disclosure.

FIG. 12 is a structural diagram of a network control entity according to an embodiment of this disclosure. As shown in FIG. 12, the network control entity 1200 includes:

a receiving module 1201, configured to receive information about air interface resources used by a terminal in proximity-based communication.

Optionally, the information about air interface resources includes at least one of the following:

a type of air interface resource and the number of air interface resources.

Optionally, the number of air interface resources includes:

the number of air interface resources of each type of air interface resource.

Optionally, the type of air interface resource includes at least one of the following:

frequency domain resources and time domain resources.

Optionally, the frequency domain resources include frequency domain resources of at least one spectrum resource type; and/or the time domain resources include time domain resources of at least one spectrum resource type.

Optionally, the at least one spectrum resource type includes at least one of the following:

licensed spectrum, unlicensed spectrum, and ITS spectrum.

Optionally, the frequency domain resources include frequency domain resources of at least one spectrum resource range; and/or the time domain resources include time domain resources of at least one spectrum resource range.

Optionally, the at least one spectrum resource range includes at least one of the following:

a first carrier and a first frequency band.

Optionally, the receiving information about air interface resources used by the terminal in proximity-based communication includes:

receiving a usage information reporting list, where the usage information reporting list includes the information about air interface resources.

Optionally, the usage information reporting list further includes:

indication information used to indicate the reported air interface resource type.

Figure 13:
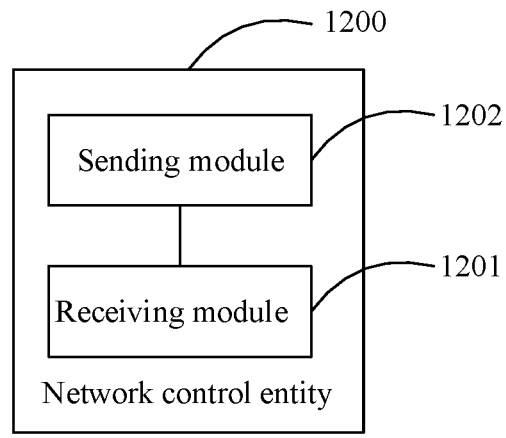
FIG. 13 is a structural diagram of another network control entity according to an embodiment of this disclosure.

Optionally, as shown in FIG. 13, the network control entity 1200 further includes:

a sending module 1202, configured to send a policy parameter, where the policy parameter is used to indicate a type of air interface resource reported by the terminal.

Optionally, the policy parameter includes:

usage information reporting configuration, where the usage information reporting configuration is used to indicate the type of air interface resource reported by the terminal.

Optionally, in a case that the proximity-based communication is ProSe direct communication, the network control entity is a ProSe function; or in a case that the proximity-based communication is V2X communication, the network control entity is a V2X control function or a PCF; or in a case that the proximity-based communication is UAS communication, the network control entity is a UAS control function.

Optionally, the proximity-based communication includes one of the following:

one-to-many proximity-based communication in network coverage;

one-to-one proximity-based communication in network coverage;

one-to-many proximity-based communication out of network coverage; and one-to-one proximity-based communication out of network coverage.

The terminal according to this embodiment of this disclosure can implement the processes implemented by the network control entity in the method embodiment in FIG. 6.

To avoid repetition, details are not described herein again. In addition, the charging accuracy of the proximity-based communication can be improved.

Figure 14:
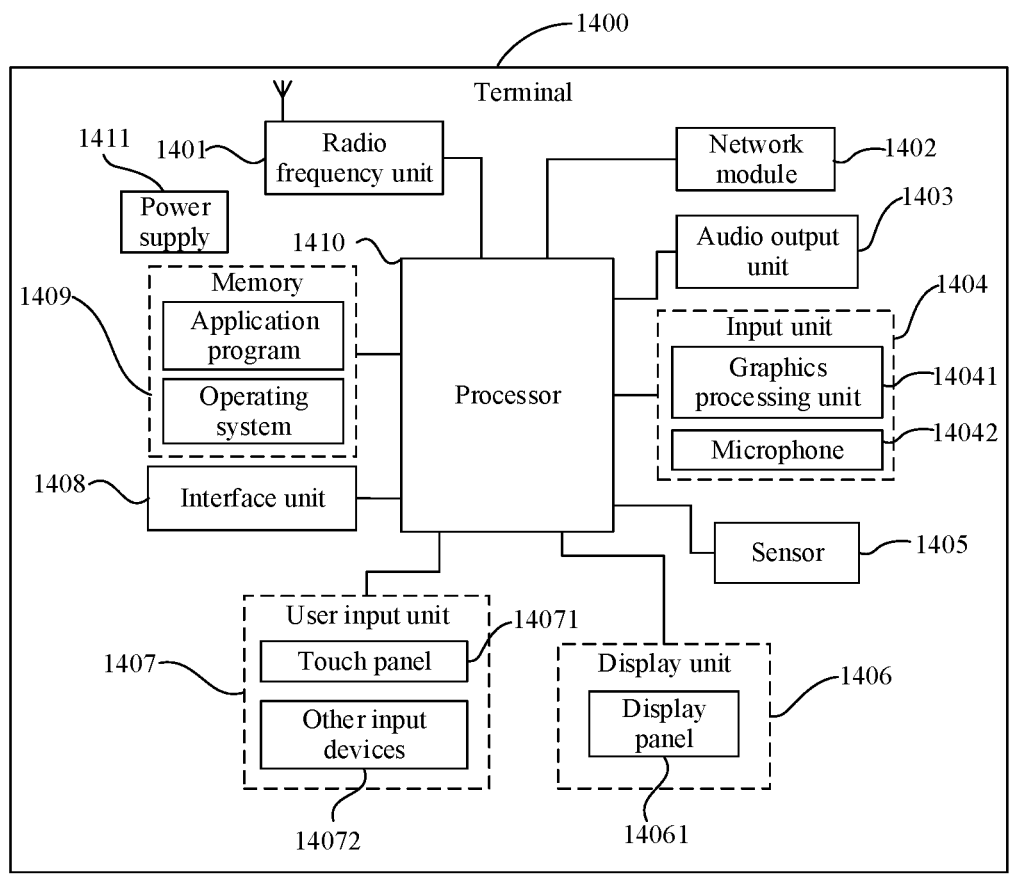
FIG. 14 is a structural diagram of another terminal according to an embodiment of this disclosure.

FIG. 14 is a schematic diagram of a hardware structure of a terminal for implementing the embodiments of this disclosure.

The terminal 1400 includes, but is not limited to, components such as a radio frequency unit 1401, a network module 1402, an audio output unit 1403, an input unit 1404, a sensor 1405, a display unit 1406, a user input unit 1407, an interface unit 1408, a memory 1409, a processor 1410, and a power supply 1411. A person skilled in the art may understand that the structure of the terminal shown in FIG. 14 does not constitute a limitation on the terminal. The terminal may include more or fewer components than those shown in the figure, or some components are combined, or component arrangements are different. In this embodiment of this disclosure, the terminal includes, but is not limited to, a mobile phone, a tablet computer, a notebook computer, a palmtop computer, an in-vehicle terminal, a robot, a wearable device, a pedometer, or the like.

The radio frequency unit 1401 is configured to report information about air interface resources used by the terminal in proximity-based communication.

Optionally, the information about air interface resources includes at least one of the following:
 a type of air interface resource and the number of air interface resources.

Optionally, the number of air interface resources includes:
 the number of air interface resources of each type of air interface resource.

Optionally, the type of air interface resource includes at least one of the following:
 frequency domain resources and time domain resources.

Optionally, the frequency domain resources include frequency domain resources of at least one spectrum resource type; and/or
 the time domain resources include time domain resources of at least one spectrum resource type.

Optionally, the at least one spectrum resource type includes at least one of the following:
 licensed spectrum, unlicensed spectrum, and ITS spectrum.

Optionally, the frequency domain resources include frequency domain resources of at least one spectrum resource range; and/or
 the time domain resources include time domain resources of at least one spectrum resource range.

Optionally, the at least one spectrum resource range includes at least one of the following:
 a first carrier and a first frequency band.

Optionally, the reporting information about air interface resources used by the terminal in proximity-based communication includes:
 reporting a usage information reporting list, where the reported usage information reporting list includes the information about air interface resources.

Optionally, before the reporting information about air interface resources used by the terminal in proximity-based communication, the radio frequency unit 1401 is further configured to:
 obtain a policy parameter, where the policy parameter is used to indicate a type of air interface resource reported by the terminal.

Optionally, the policy parameter includes:
 usage information reporting configuration, where the usage information reporting configuration is used to indicate the type of air interface resource reported by the terminal.

Optionally, the reporting information about air interface resources used by the terminal in proximity-based communication includes:
 reporting, to a network control entity, the information about air interface resources used by the terminal in proximity-based communication.

Optionally, in a case that the proximity-based communication is proximity-based service ProSe direct communication, the network control entity is a ProSe function; or
 in a case that the proximity-based communication is vehicle to everything V2X communication, the network control entity is a V2X control function or a policy control function PCF; or
 in a case that the proximity-based communication is unmanned aerial system UAS communication, the network control entity is a UAS control function.

Optionally, the proximity-based communication includes one of the following:
 one-to-many proximity-based communication in network coverage;
 one-to-one proximity-based communication in network coverage;
 one-to-many proximity-based communication out of network coverage; and
 one-to-one proximity-based communication out of network coverage.

The terminal can improve the charging accuracy of the proximity-based communication.

It should be understood that, in this embodiment of this disclosure, the radio frequency unit 1401 may be configured to transmit or receive a signal in an information transmitting/receiving or call process. Specifically, the radio frequency unit 1401 receives downlink data from a base station, transmits the downlink data to the processor 1410 for processing, and transmits uplink data to the base station. Generally, the radio frequency unit 1401 includes, but is not limited to, an antenna, at least one amplifier, a transceiver, a coupler, a low noise amplifier, a duplexer, and the like. In addition, the radio frequency unit 1401 may further communicate with a network and another device through a wireless communications system.

The terminal provides a user with wireless broadband Internet access by using the network module 1402, for example, helps the user send or receive an email, browse a web page, access streaming media, and the like.

The audio output unit 1403 may convert audio data received by the radio frequency unit 1401 or the network module 1402 or stored in the memory 1409 into an audio signal and output the audio signal as a sound. In addition, the audio output unit 1403 may further provide audio output (for example, a call signal reception tone or a message reception tone) that is related to a specific function performed by the terminal 1400. The audio output unit 1403 includes a speaker, a buzzer, a telephone receiver, and the like.

The input unit 1404 is configured to receive an audio or video signal. The input unit 1404 may include a graphics processing unit (Graphics Processing Unit, GPU) 14041 and a microphone 14042, and the graphics processing unit 14041 processes image data of a still picture or a video obtained by an image capture apparatus (for example, a camera) in an image capture mode or a video capture mode. A processed image frame may be displayed on the display unit 1406. An image frame processed by the graphics processing unit

14041 may be stored in the memory 1409 (or another storage medium) or sent by the radio frequency unit 1401 or the network module 1402. The microphone 14042 can receive a sound and can process the sound into audio data. The processed audio data can be converted, for outputting, into a format that can be sent to a mobile communication base station through the radio frequency unit 1401 in a telephone call mode.

The terminal 1400 further includes at least one sensor 1405, for example, an optical sensor, a motion sensor, and other sensors. Specifically, the optical sensor includes an ambient light sensor and a proximity sensor. The ambient light sensor may adjust brightness of a display panel 14061 based on intensity of ambient light. When the terminal 1400 moves near an ear, the proximity sensor may disable the display panel 14061 and/or backlight. As a type of motion sensor, an accelerometer sensor can detect magnitudes of accelerations in all directions (usually three axes), can detect a magnitude and a direction of gravity when being static, and can be applied to terminal posture recognition (such as screen switching between portrait and landscape, related games, and magnetometer posture calibration), functions related to vibration recognition (such as a pedometer and tapping), and the like. The sensor 1405 may also include a fingerprint sensor, a pressure sensor, an iris sensor, a molecular sensor, a gyroscope, a barometer, a hygrometer, a thermometer, an infrared sensor, and the like. Details are not described herein.

The display unit 1406 is configured to display information input by the user or information provided for the user. The display unit 1406 may include the display panel 14061. The display panel 14061 may be configured in a form of a liquid crystal display (Liquid Crystal Display, LCD), an organic light-emitting diode (Organic Light-Emitting Diode, OLED), or the like.

The user input unit 1407 may be configured to receive input digit or character information, and generate key signal input that is related to user setting and function control of the terminal. Specifically, the user input unit 1407 includes a touch panel 14071 and other input devices 14072. The touch panel 14071, also referred to as a touchscreen, may capture a touch operation performed by a user on or near the touch panel (for example, an operation performed by the user on the touch panel 14071 or near the touch panel 14071 by using any appropriate object or accessory such as a finger or a stylus). The touch panel 14071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1410, and receives and executes a command sent by the processor 1410. In addition, the touch panel 14071 may be implemented in a plurality of forms, for example, as a resistive, capacitive, infrared, or surface acoustic wave touch panel. The user input unit 1407 may further include other input devices 14072 in addition to the touch panel 14071. Specifically, the other input devices 14072 may include but are not limited to a physical keyboard, a function key (such as a volume control key or a power on/off key), a trackball, a mouse, a joystick, and the like. Details are not described herein.

Further, the touch panel 14071 may cover the display panel 14061. After detecting a touch operation on or near the touch panel 14071, the touch panel 14071 transmits the touch operation to the processor 1410 to determine a type of a touch event. Then the processor 1410 provides corresponding visual output on the display panel 14061 based on the type of the touch event. Although the touch panel 14071 and the display panel 14061 are used as two separate components to implement input and output functions of the terminal in FIG. 14, the touch panel 14071 and the display panel 14061 may be integrated to implement the input and output functions of the terminal in some embodiments. This is not specifically limited herein.

The interface unit 1408 is an interface for connecting an external apparatus to the terminal 1400. For example, the external apparatus may include a wired or wireless headphone port, an external power supply (or battery charger) port, a wired or wireless data port, a memory card port, a port for connecting an apparatus provided with an identification module, an audio input/output (I/O) port, a video I/O port, or an earphone port. The interface unit 1408 may be configured to receive input (for example, data information and electric power) from the external apparatus, and transmit the received input to one or more elements in the terminal 1400; or may be configured to transmit data between the terminal 1400 and the external apparatus.

The memory 1409 may be configured to store a software program and various data. The memory 1409 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 1409 may include a high-speed random access memory, or may include a non-volatile memory, for example, at least one magnetic disk storage device, a flash memory device, or other volatile solid-state storage devices.

The processor 1410 is a control center of the terminal, and is connected to all components of the terminal by using various interfaces and lines. By running or executing a software program and/or a module stored in the memory 1409 and invoking data stored in the memory 1409, the processor 1410 executes various functions of the terminal and processes data, so as to perform overall monitoring on the terminal. The processor 1410 may include one or more processing units. Optionally, the processor 1410 may integrate an application processor and a modem processor. The application processor mainly processes an operating system, a user interface, an application program, and the like. The modem processor mainly processes wireless communication. It may be understood that the modem processor may alternatively not be integrated into the processor 1410.

The terminal 1400 may further include the power supply 1411 (for example, a battery) that supplies power to each component. Optionally, the power supply 1411 may be logically connected to the processor 1410 by using a power management system, so as to implement functions such as charging management, discharging management, and power consumption management by using the power management system.

In addition, the terminal 1400 includes some functional modules that are not shown. Details are not described herein.

Figure 15:
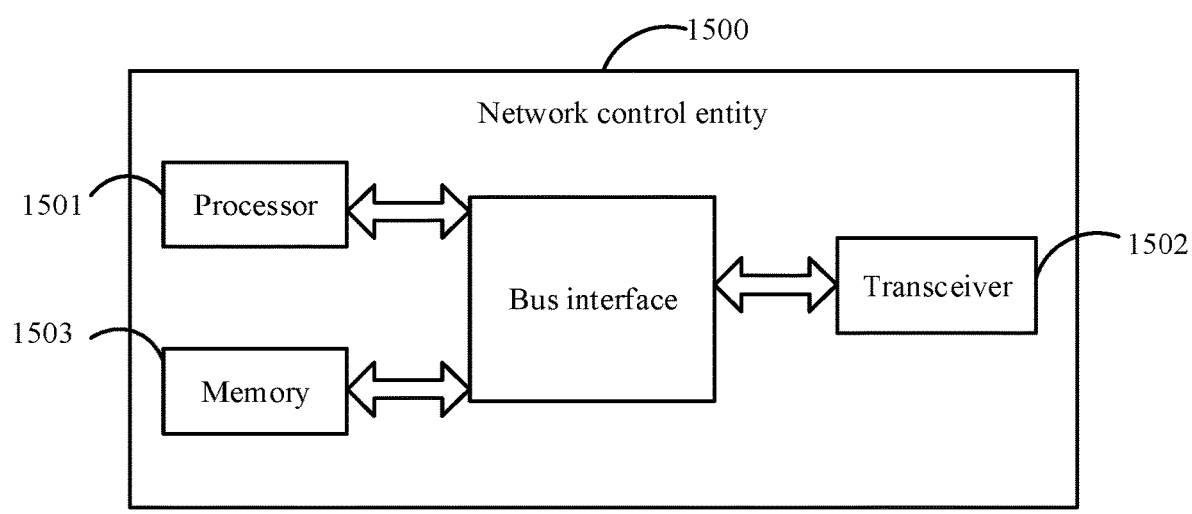
FIG. 15 is a structural diagram of another network control entity according to an embodiment of this disclosure.

Optionally, an embodiment of this disclosure further provides a terminal, including a processor 1410, a memory 1409, and a program stored in the memory 1409 and capable of running on the processor 1410. When the program is executed by the processor 1410, the processes of the foregoing information reporting method embodiments are implemented, and a same technical effect can be achieved. To avoid repetition, details are not described herein again.

FIG. 15 is a structural diagram of another network control entity according to an embodiment of this disclosure. As shown in FIG. 15, the network control entity 1500 includes a processor 1501, a transceiver 1502, a memory 1503, and a bus interface.

The transceiver 1502 is configured to receive information about air interface resources used by a terminal in proximity-based communication.

Optionally, the information about air interface resources includes at least one of the following:
a type of air interface resource and the number of air interface resources.

Optionally, the number of air interface resources includes:
the number of air interface resources of each type of air interface resource.

Optionally, the type of air interface resource includes at least one of the following:
frequency domain resources and time domain resources.

Optionally, the frequency domain resources include frequency domain resources of at least one spectrum resource type; and/or
the time domain resources include time domain resources of at least one spectrum resource type.

Optionally, the at least one spectrum resource type includes at least one of the following:
licensed spectrum, unlicensed spectrum, and ITS spectrum.

Optionally, the frequency domain resources include frequency domain resources of at least one spectrum resource range; and/or
the time domain resources include time domain resources of at least one spectrum resource range.

Optionally, the at least one spectrum resource range includes at least one of the following:
a first carrier and a first frequency band.

Optionally, the receiving information about air interface resources used by a terminal in proximity-based communication includes:
receiving a usage information reporting list, where the reported usage information reporting list includes the information about air interface resources.

Optionally, before the receiving information about air interface resources used by a terminal in proximity-based communication, the transceiver 1502 is further configured to:
send a policy parameter, where the policy parameter is used to indicate a type of air interface resource reported by the terminal.

Optionally, the policy parameter includes:
usage information reporting configuration, where the usage information reporting configuration is used to indicate the type of air interface resource reported by the terminal.

Optionally, in a case that the proximity-based communication is ProSe direct communication, the network control entity is a ProSe function; or
in a case that the proximity-based communication is V2X communication, the network control entity is a V2X control function or a PCF; or
in a case that the proximity-based communication is UAS communication, the network control entity is a UAS control function.

Optionally, the proximity-based communication includes one of the following:
one-to-many proximity-based communication in network coverage;
one-to-one proximity-based communication in network coverage;
one-to-many proximity-based communication out of network coverage; and
one-to-one proximity-based communication out of network coverage.

The network control entity can improve the charging accuracy of the proximity-based communication.

The transceiver 1502 is configured to receive and send data under control of the processor 1501. The transceiver 1502 includes at least two antenna ports.

In FIG. 15, a bus architecture may include any quantity of interconnected buses and bridges, and specifically connect together various circuits of one or more processors represented by the processor 1501 and a memory represented by the memory 1503. The bus architecture may further interconnect various other circuits such as a peripheral device, a voltage regulator, and a power management circuit. These are all well known in the art, and therefore are not further described in this specification. The bus interface provides an interface. The transceiver 1502 may be a plurality of components, including a transmitter and a receiver, and provides units for communicating with a variety of other apparatuses on a transmission medium. For different user equipment, the user interface 1504 may also be an interface capable of externally or internally connecting a required device, and the connected device includes, but is not limited to, a keypad, a display, a speaker, a microphone, a joystick, and the like.

The processor 1501 is responsible for management of the bus architecture and general processing, and the memory 1503 may store data for use by the processor 1501 when the processor 1501 performs an operation.

Optionally, an embodiment of this disclosure further provides a network control entity, including a processor 1501, a memory 1503, and a program stored in the memory 1503 and capable of running on the processor 1501. When the program is executed by the processor 1501, the processes of the foregoing information receiving method embodiments are implemented, and a same technical effect can be achieved. To avoid repetition, details are not described herein again.

An embodiment of this disclosure further provides a computer-readable storage medium, where the computer-readable storage medium stores a program, and when the program is executed by a processor, the processes of the information reporting method embodiment according to this embodiment of this application are implemented, or when the program is executed by a processor, the processes of the information receiving method embodiment according to this embodiment of this application are implemented, and a same technical effect can be achieved. To avoid repetition, details are not described herein again. For example, the computer-readable storage medium is a read-only memory (Read-Only Memory, ROM for short), a random access memory (Random Access Memory, RAM for short), a magnetic disk, an optical disc, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An information reporting method, applied to a terminal and comprising:
    when the terminal returns to a network coverage after a proximity-based communication process, reporting at least one of frequency domain resources or time domain resources used by the terminal in proximity-based communication, wherein the at least one of frequency domain resources or time domain resources used by the terminal is provided for charging the proximity-based communication;
    wherein the reporting at least one of frequency domain resources or time domain resources used by the terminal in proximity-based communication comprises:
    reporting, to a network control entity, the at least one of frequency domain resources or time domain resources used by the terminal in proximity-based communication for charging the proximity-based communication, wherein the at least one of frequency domain resources or time domain resources reported by the terminal is used by the network control entity for charging;
    wherein, in a case that the proximity-based communication is proximity-based service ProSe direct communication, the network control entity is a ProSe function; or
    in a case that the proximity-based communication is vehicle to everything V2X communication, the network control entity is a V2X control function or a policy control function PCF; or
    in a case that the proximity-based communication is unmanned aerial system UAS communication, the network control entity is a UAS control function;
    wherein before the reporting at least one of frequency domain resources or time domain resources used by the terminal in proximity-based communication, the method further comprises:
    obtaining usage information reporting configuration, wherein the usage information reporting configuration is used to indicate the terminal to report at least one of frequency domain resources or time domain resources used by the terminal in proximity-based communication.

2. The method according to claim 1, wherein the method further comprises:
    reporting, to a network control entity, the number of air interface resources,
    wherein the number of air interface resources comprise the number of air interface resources of the frequency domain resources of at least one first carrier.

3. The method according to claim 1,
    wherein the frequency domain resources further comprise frequency domain resources of at least one spectrum resource type; and/or,
    the time domain resources comprise time domain resources of at least one spectrum resource type and/or time domain resources of at least one spectrum resource range.

4. The method according to claim 3, wherein the at least one spectrum resource range further comprises:
    a first frequency band.

5. The method according to claim 1, wherein the reporting at least one of frequency domain resources or time domain resources used by the terminal in proximity-based communication comprises:
    reporting a usage information reporting list, wherein the usage information reporting list comprises the at least one of frequency domain resources or time domain resources used by the terminal in proximity-based communication.

6. The method according to claim 1, wherein the usage information reporting configuration is comprised in a policy parameter.

7. A non-transitory computer-readable storage medium, wherein the computer-readable storage medium stores a program, and when the program is executed by a processor, the steps of the information reporting method according to claim 1 are implemented.

8. An information receiving method, applied to a network control entity and comprising:
    receiving at least one of frequency domain resources or time domain resources used by a terminal in communication based on PC5 interface, wherein the at least one of frequency domain resources or time domain resources used by a terminal is reported when the terminal returns to a network coverage after a proximity-based communication process;
    wherein the at least one of frequency domain resources or time domain resources used by the terminal in proximity-based communication is reported to the network control entity for charging the proximity-based communication, wherein the at least one of frequency domain resources or time domain resources reported by the terminal is used by the network control entity for charging;
    wherein, in a case that the proximity-based communication is proximity-based service ProSe direct communication, the network control entity is a ProSe function; or
    in a case that the proximity-based communication is vehicle to everything V2X communication, the network control entity is a V2X control function or a policy control function PCF; or
    in a case that the proximity-based communication is unmanned aerial system UAS communication, the network control entity is a UAS control function;

wherein the receiving at least one of frequency domain resources or time domain resources used by the terminal in proximity-based communication comprises:

receiving a usage information reporting list, wherein the usage information reporting list comprises at least one of frequency domain resources or time domain resources used by the terminal in proximity-based communication.

9. The method according to claim 8, wherein the method further comprises:

receiving the number of air interface resources, wherein the number of air interface resources comprise the number of air interface resources of the frequency domain resources of at least one first carrier.

10. The method according to claim 8, wherein the frequency domain resources further comprise frequency domain resources of at least one spectrum resource type; and/or, the time domain resources comprise time domain resources of at least one spectrum resource type and/or time domain resources of at least one spectrum resource range.

11. The method according to claim 10, wherein the at least one spectrum resource range further comprises:

a first frequency band.

12. A network device, comprising a memory, a processor, and a program stored in the memory and capable of running on the processor, wherein when the program is executed by the processor, the steps of the information receiving method according to claim 8 are implemented.

13. A non-transitory computer-readable storage medium, wherein the computer-readable storage medium stores a program, and when the program is executed by a processor, the steps of the information receiving method according to claim 8 are implemented.

14. A terminal, comprising a memory, a processor, and a program stored in the memory and capable of running on the processor, wherein when the program is executed by the processor, the steps of an information reporting method are implemented, the method comprising:

when the terminal returns to a network coverage after a proximity-based communication process, reporting at least one of frequency domain resources or time domain resources used by the terminal in proximity-based communication, wherein the at least one of frequency domain resources or time domain resources used by the terminal is provided for charging the proximity-based communication;

wherein the reporting at least one of frequency domain resources or time domain resources used by the terminal in proximity-based communication comprises:

reporting, to a network control entity, the at least one of frequency domain resources or time domain resources used by the terminal in proximity-based communication for charging the proximity-based communication, wherein the at least one of frequency domain resources or time domain resources reported by the terminal is used by the network control entity for charging;

wherein, in a case that the proximity-based communication is proximity-based service ProSe direct communication, the network control entity is a ProSe function; or in a case that the proximity-based communication is vehicle to everything V2X communication, the network control entity is a V2X control function or a policy control function PCF; or in a case that the proximity-based communication is unmanned aerial system UAS communication, the network control entity is a UAS control function;

wherein before the reporting at least one of frequency domain resources or time domain resources used by the terminal in proximity-based communication, the method further comprises:

obtaining usage information reporting configuration, wherein the usage information reporting configuration is used to indicate the terminal to report at least one of frequency domain resources or time domain resources used by the terminal in proximity-based communication.

* * * * *